(12) United States Patent
Ding et al.

(10) Patent No.: US 12,627,151 B2
(45) Date of Patent: May 12, 2026

(54) DEVICES, METHODS, AND MEDIA FOR CHARGING DISPATCHING

(71) Applicant: XCHARGE ENERGY USA INC., San Marcos, TX (US)

(72) Inventors: Rui Ding, San Marcos, TX (US); Junshuai Wang, San Marcos, TX (US)

(73) Assignee: XCHARGE ENERGY USA INC., San Marcos, TX (US)

( * ) Notice: Subject to any disclaimer, the term of this patent is extended or adjusted under 35 U.S.C. 154(b) by 390 days.

(21) Appl. No.: 18/456,485

(22) Filed: Aug. 26, 2023

(65) Prior Publication Data

US 2025/0070559 A1 Feb. 27, 2025

Related U.S. Application Data

(63) Continuation of application No. PCT/US2023/072685, filed on Aug. 22, 2023.

(51) Int. Cl.
| | |
|---|---|
| *H02J 3/32* | (2026.01) |
| *H02J 3/00* | (2026.01) |
| *H02J 101/24* | (2026.01) |

(52) U.S. Cl.
CPC ............... *H02J 3/32* (2013.01); *H02J 3/003* (2020.01); *H02J 2101/24* (2026.01)

(58) Field of Classification Search
CPC ...................................................... H02J 3/003
See application file for complete search history.

(56) References Cited

U.S. PATENT DOCUMENTS

| | | | |
|---|---|---|---|
| D669,026 S | 10/2012 | Oda et al. | |
| D674,335 S | 1/2013 | Yamashita et al. | |
| D733,647 S | 7/2015 | Farrell | |
| D833,387 S | 11/2018 | Baxter et al. | |
| D907,574 S | 1/2021 | Yang et al. | |
| D908,614 S | 1/2021 | Chaudhuri et al. | |
| D914,593 S | 3/2021 | Frerichs et al. | |
| D922,943 S | 6/2021 | Reitenbach et al. | |

(Continued)

OTHER PUBLICATIONS

International Search Report in PCT/US23/72685 mailed on Nov. 14, 2023, 3 pages.

(Continued)

*Primary Examiner* — Nathan L Laughlin
(74) *Attorney, Agent, or Firm* — METIS IP LLC

(57) ABSTRACT

The present disclosure provides a device, a method, and a medium for charging. The device for charging includes a first sensor, a second sensor, a third sensor, a charging pile, and a processor. The first sensor obtains first sensing information from a battery connected with the charging pile. The second sensor obtains second sensing information from a photovoltaic system connected with the charging pile. The third sensor obtains third sensing information from a power grid connected with the charging pile. The charging pile transmits power to a target object. The processor is configured to determine power storage information of the battery, photovoltaic power supply information of the photovoltaic system, and power grid power supply information of the power grid, respectively; determine the target object to be charged based on the power pile; determine a source object, and, control the charging pile to transmit power to the target object.

18 Claims, 8 Drawing Sheets

100

(56)                References Cited

U.S. PATENT DOCUMENTS

| | | | |
|---|---|---|---|
| D942,378 S | 2/2022 | Park et al. | |
| D942,937 S | 2/2022 | Kihl et al. | |
| D943,518 S | 2/2022 | Kihl et al. | |
| D947,776 S | 4/2022 | Semboloni | |
| D948,425 S | 4/2022 | Erni | |
| D961,502 S | 8/2022 | Hwang | |
| D962,856 S | 9/2022 | Mercer et al. | |
| D966,185 S | 10/2022 | Gupta et al. | |
| D967,011 S | 10/2022 | Mercer et al. | |
| D967,012 S | 10/2022 | Mercer et al. | |
| 11,532,943 B1 * | 12/2022 | Zauli | H02J 3/32 |
| D976,812 S | 1/2023 | Hwang | |
| D977,428 S | 2/2023 | Hikita | |
| D988,992 S | 6/2023 | Moreira Da Silva et al. | |
| 11,668,432 B1 | 6/2023 | Ledesma et al. | |
| D996,357 S | 8/2023 | Steenwyk | |
| D996,365 S | 8/2023 | Frazier | |
| D1,005,937 S | 11/2023 | Mercer et al. | |
| D1,005,938 S | 11/2023 | Mercer et al. | |
| D1,005,939 S | 11/2023 | Zhong | |
| D1,005,941 S | 11/2023 | Zhong | |
| D1,008,950 S | 12/2023 | Prodaniuk et al. | |
| D1,015,266 S | 2/2024 | Yoon et al. | |
| D1,019,547 S | 3/2024 | Yan et al. | |
| D1,021,775 S | 4/2024 | Fan et al. | |
| D1,021,776 S | 4/2024 | Fan et al. | |
| D1,021,777 S | 4/2024 | Fan et al. | |
| D1,021,778 S | 4/2024 | Fan et al. | |
| D1,021,779 S | 4/2024 | Fan et al. | |
| D1,022,882 S | 4/2024 | Fan et al. | |
| D1,022,883 S | 4/2024 | Fan et al. | |
| D1,022,884 S | 4/2024 | Fan et al. | |
| D1,022,885 S | 4/2024 | Fan et al. | |
| D1,029,755 S | 6/2024 | Gehrmann et al. | |
| D1,030,641 S | 6/2024 | Jung | |
| D1,030,642 S | 6/2024 | Jung | |
| D1,030,650 S | 6/2024 | Speidel | |
| D1,037,143 S | 7/2024 | Koz et al. | |
| D1,038,014 S | 8/2024 | Cumming et al. | |
| D1,040,740 S | 9/2024 | Bauer | |
| D1,040,744 S | 9/2024 | Koz et al. | |
| D1,040,745 S | 9/2024 | Cumming et al. | |
| D1,040,746 S | 9/2024 | Cumming et al. | |
| D1,044,704 S | 10/2024 | Fan et al. | |
| D1,050,023 S | 11/2024 | Peng | |
| D1,053,802 S | 12/2024 | Helgesson et al. | |
| D1,059,272 S | 1/2025 | Mercer et al. | |
| D1,060,223 S | 2/2025 | Ledesma et al. | |
| D1,060,226 S | 2/2025 | Yao et al. | |
| D1,061,426 S | 2/2025 | Wang | |
| D1,061,429 S | 2/2025 | Kim et al. | |
| D1,063,827 S | 2/2025 | Ye et al. | |
| D1,063,828 S | 2/2025 | Ye et al. | |
| D1,063,834 S | 2/2025 | Letombe et al. | |
| D1,065,062 S | 3/2025 | Ye et al. | |
| D1,065,072 S | 3/2025 | Wang | |
| D1,066,242 S | 3/2025 | Mercer et al. | |
| D1,068,646 S | 4/2025 | Riggs et al. | |
| D1,068,650 S | 4/2025 | Yoon et al. | |
| 2012/0299529 A1 * | 11/2012 | Guo | H01M 10/465 |
| | | | 320/101 |
| 2014/0142774 A1 | 5/2014 | Katayama et al. | |
| 2022/0067850 A1 | 3/2022 | Bhasme et al. | |
| 2022/0140610 A1 * | 5/2022 | Bangalore | H02J 3/322 |
| | | | 320/101 |
| 2022/0161687 A1 | 5/2022 | Al-Sagheer et al. | |
| 2022/0247179 A1 | 8/2022 | Orihashi et al. | |
| 2022/0314831 A1 | 10/2022 | Abe | |
| 2023/0001803 A1 | 1/2023 | Raaijmakers et al. | |
| 2023/0026182 A1 | 1/2023 | Bae et al. | |
| 2023/0256855 A1 * | 8/2023 | Sartipizadeh | B60L 53/64 |
| | | | 320/109 |
| 2024/0109450 A1 * | 4/2024 | Hair | H02J 7/0071 |
| 2024/0174102 A1 | 5/2024 | Molchanov et al. | |
| 2024/0326622 A1 | 10/2024 | Shin et al. | |
| 2025/0074221 A1 | 3/2025 | Lee et al. | |
| 2025/0074222 A1 | 3/2025 | Lee et al. | |

OTHER PUBLICATIONS

Written Opinion in PCT/US23/72685 mailed on Nov. 14, 2023, 6 pages.

\* cited by examiner

100

300

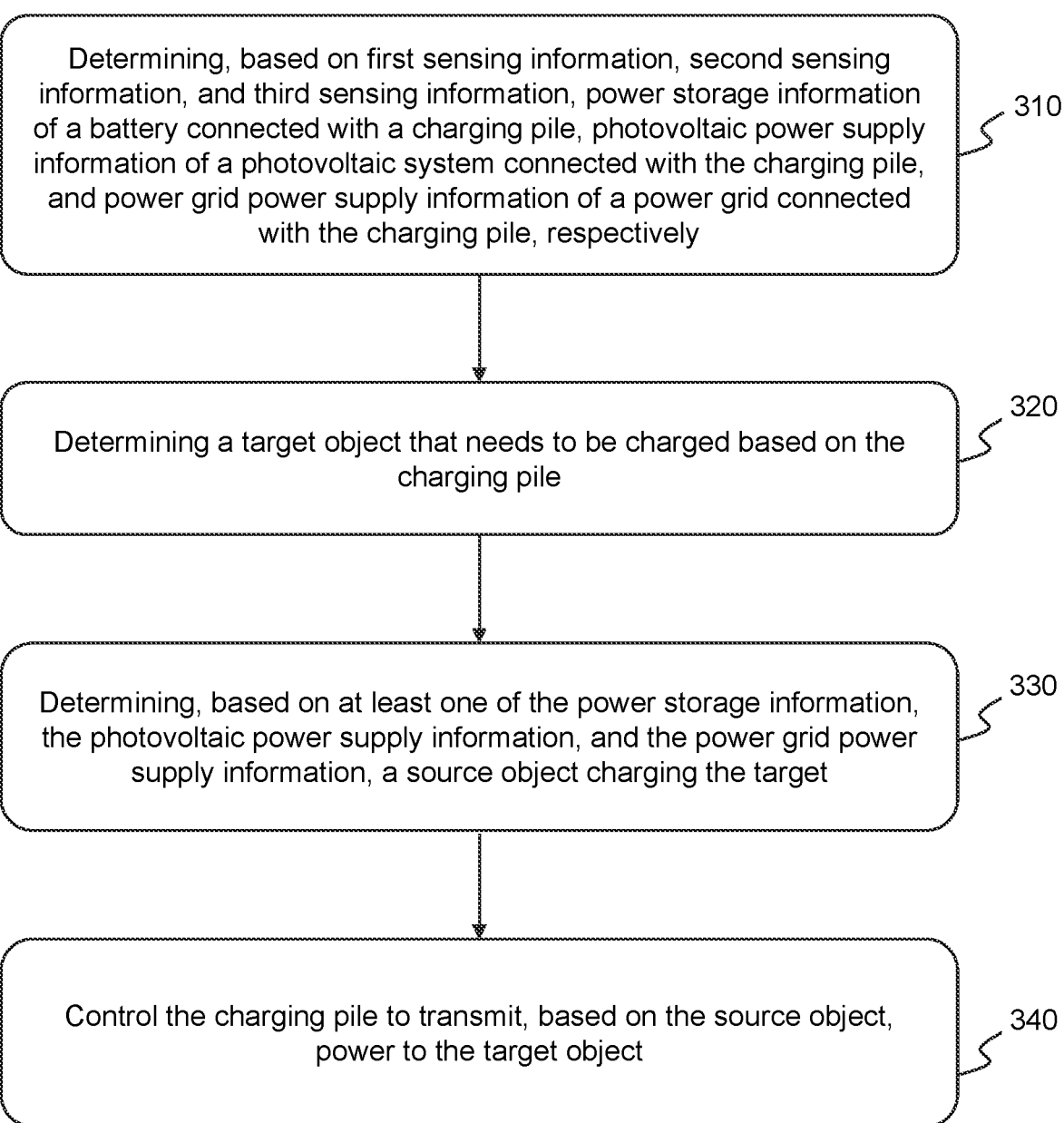

Determining, based on first sensing information, second sensing information, and third sensing information, power storage information of a battery connected with a charging pile, photovoltaic power supply information of a photovoltaic system connected with the charging pile, and power grid power supply information of a power grid connected with the charging pile, respectively    310

Determining a target object that needs to be charged based on the charging pile    320

Determining, based on at least one of the power storage information, the photovoltaic power supply information, and the power grid power supply information, a source object charging the target    330

Control the charging pile to transmit, based on the source object, power to the target object    340

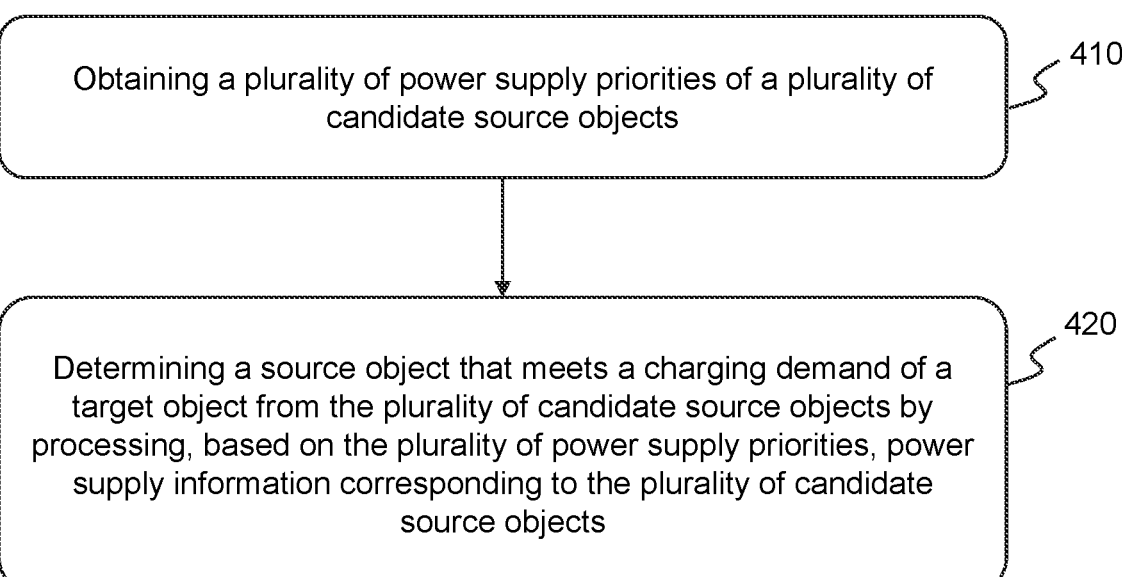

410

Obtaining a plurality of power supply priorities of a plurality of candidate source objects

420

Determining a source object that meets a charging demand of a target object from the plurality of candidate source objects by processing, based on the plurality of power supply priorities, power supply information corresponding to the plurality of candidate source objects

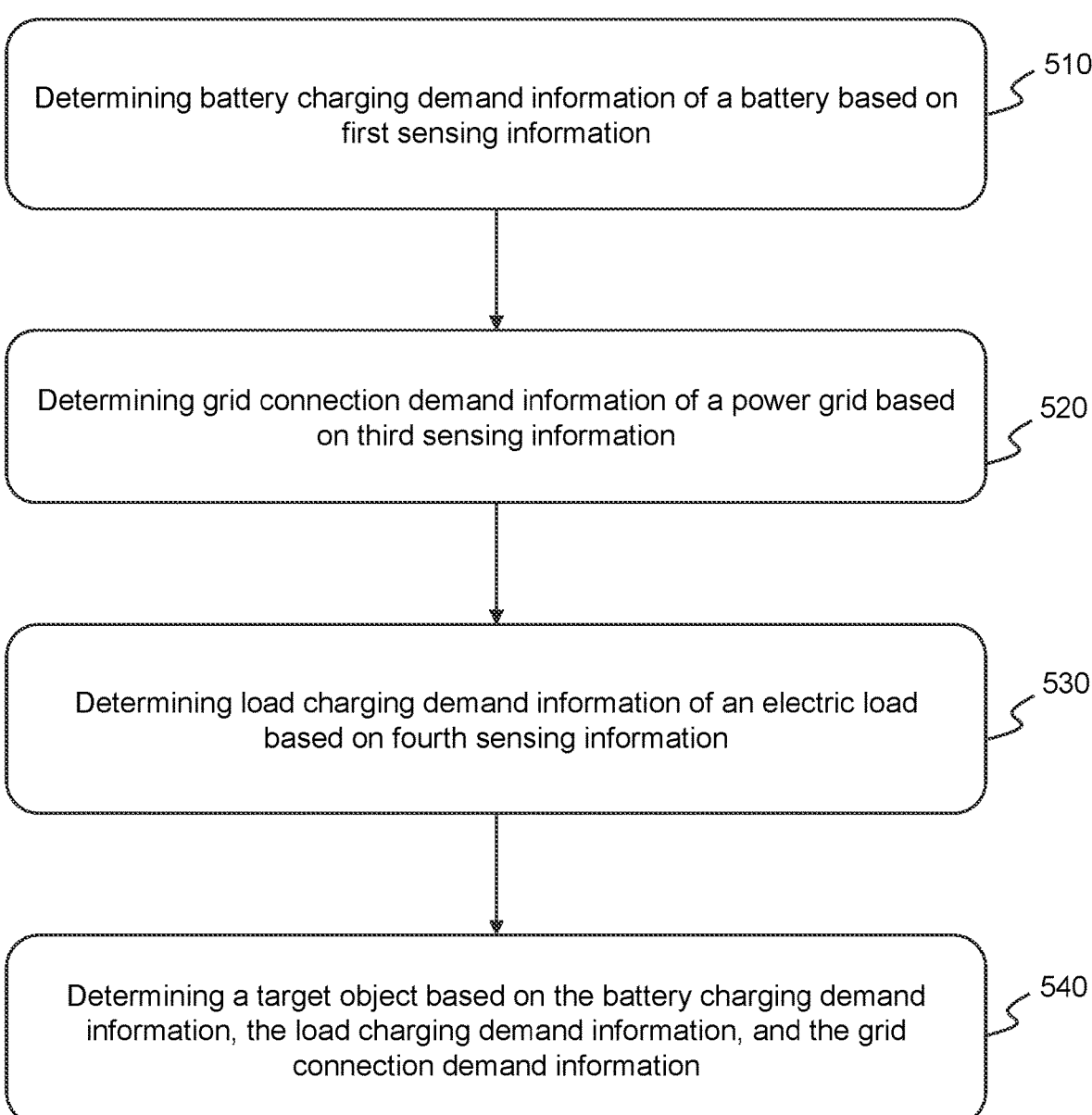

Determining battery charging demand information of a battery based on first sensing information   510

Determining grid connection demand information of a power grid based on third sensing information   520

Determining load charging demand information of an electric load based on fourth sensing information   530

Determining a target object based on the battery charging demand information, the load charging demand information, and the grid connection demand information   540

Figure 6:
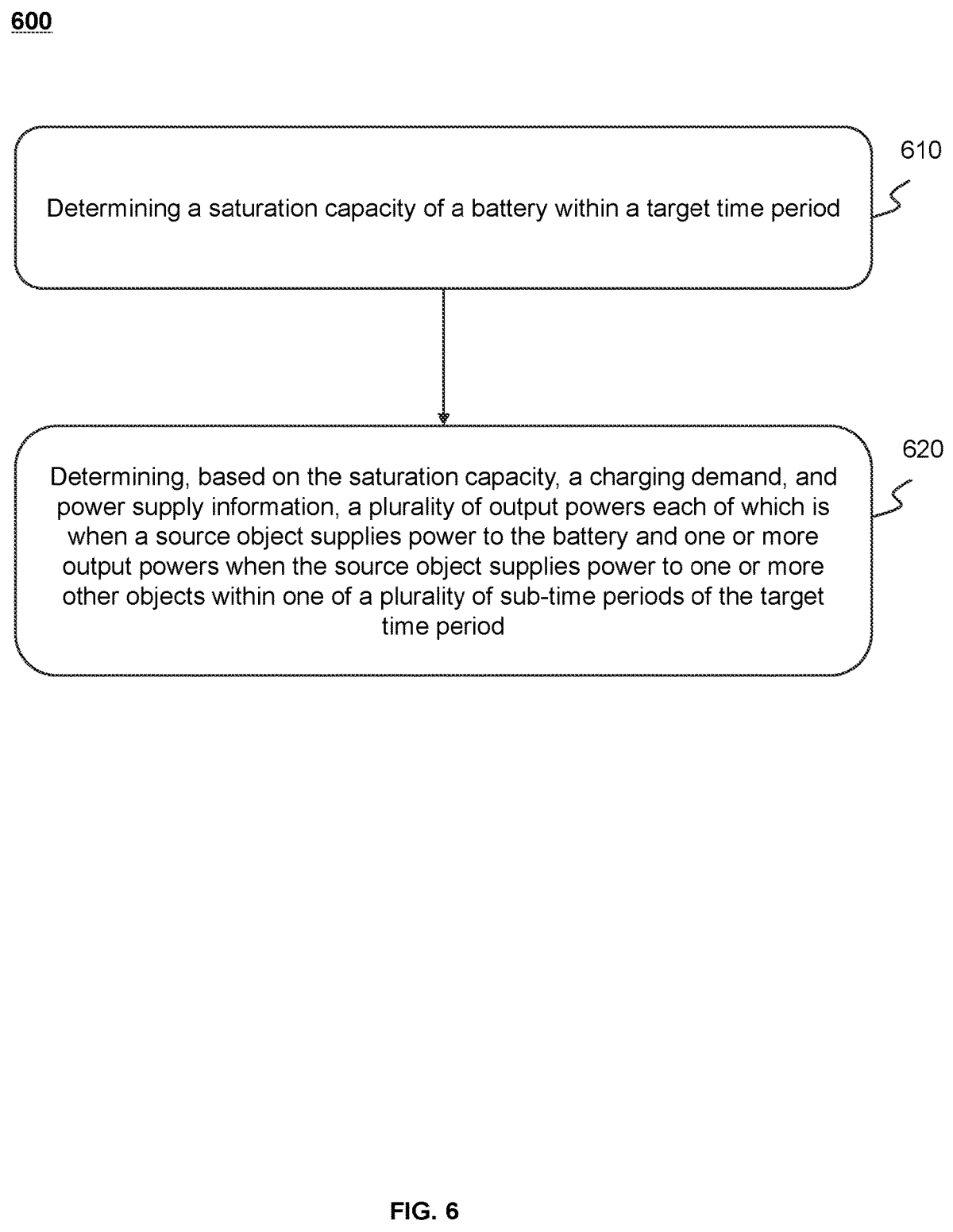

Determining a saturation capacity of a battery within a target time period    610

Determining, based on the saturation capacity, a charging demand, and power supply information, a plurality of output powers each of which is when a source object supplies power to the battery and one or more output powers when the source object supplies power to one or more other objects within one of a plurality of sub-time periods of the target time period    620

Figure 7:
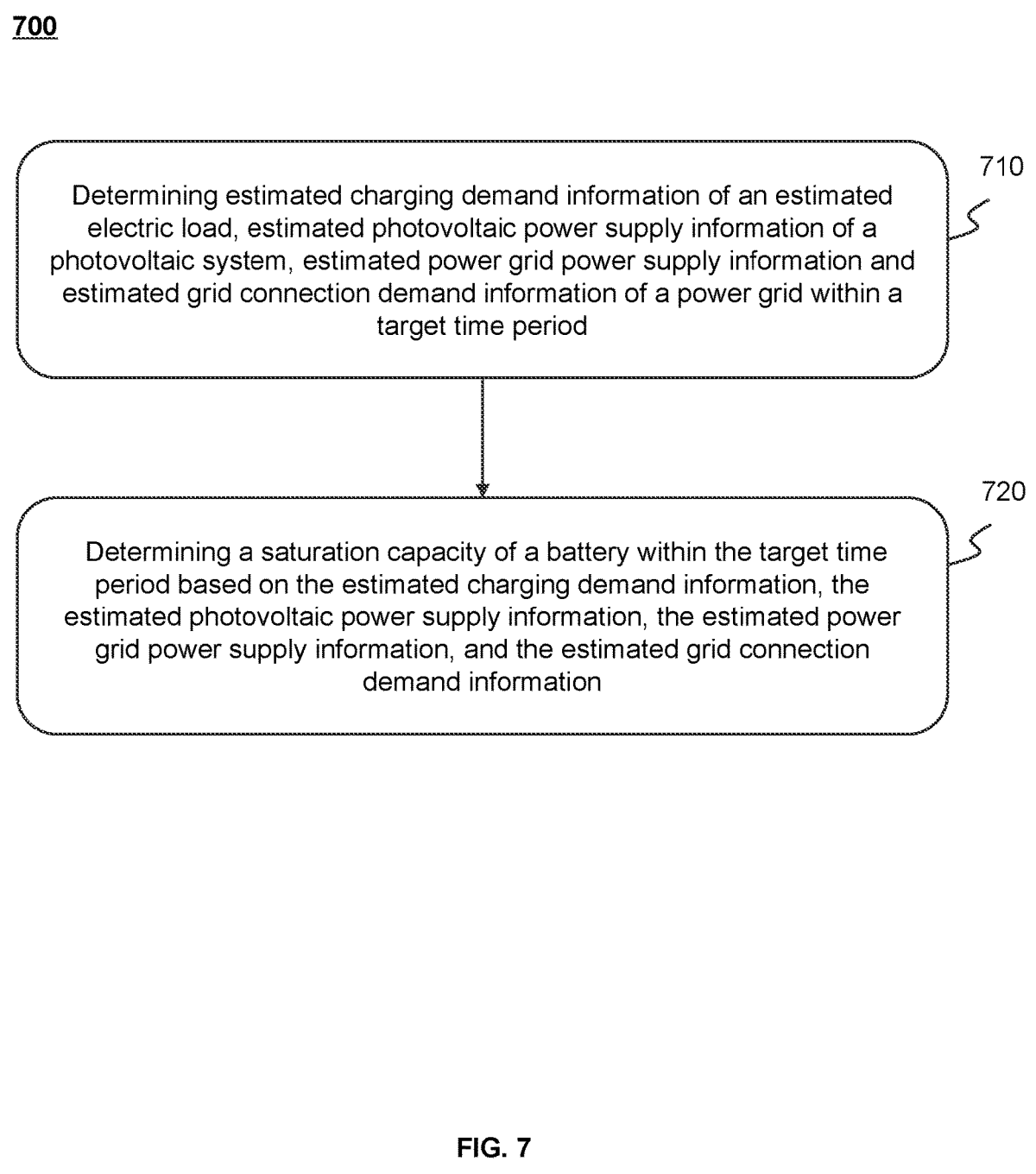

Determining estimated charging demand information of an estimated electric load, estimated photovoltaic power supply information of a photovoltaic system, estimated power grid power supply information and estimated grid connection demand information of a power grid within a target time period

710

Determining a saturation capacity of a battery within the target time period based on the estimated charging demand information, the estimated photovoltaic power supply information, the estimated power grid power supply information, and the estimated grid connection demand information

Obtaining historical charging demand information of a historical electric load and historical grid connection demand information of a power grid within a historical time period

820

Determining a time duration of a target time period based on the historical charging demand information and the historical grid connection demand information

DEVICES, METHODS, AND MEDIA FOR CHARGING DISPATCHING

CROSS-REFERENCE TO RELATED APPLICATIONS

This application is a continuation of International Application No. PCT/US23/72685, filed on Aug. 22, 2023, the entire contents of which are hereby incorporated by reference.

TECHNICAL FIELD

The present disclosure relates to a field of charging devices, and in particular, to a device, a method, and a medium for charging.

BACKGROUND

With a development of the electric vehicle industry, to satisfy the power demand of the electric vehicle, a popularity of a charging pile increases year by year. The charging pile may use an energy storage battery, a power grid, and a photovoltaic system to power the vehicle. In actual charging, due to different charging demands of users and different power supply situations of the batteries, the power grids, and the photovoltaic systems, choosing an appropriate manner to supply power has become the key to a reliable operation of the charging pile.

Therefore, it is desirable to provide a device, a method, and a medium for charging, thereby providing efficient and stable charging in different charging scenarios.

SUMMARY

One of the embodiments of the present disclosure provides a device for charging, including a first sensor, a second sensor, a third sensor, a charging pile, and a processor. The first sensor may be configured to obtain first sensing information from a battery connected with the charging pile, the first sensing information including power situation information of the battery. The second sensor may be configured to obtain second sensing information from a photovoltaic system connected with the charging pile, the second sensing information including power situation information of the photovoltaic system. The third sensor may be configured to obtain third sensing information from a power grid connected with the charging pile, the third sensing information including power situation information of the power grid. The charging pile may be configured to transmit power to a target object, the target object including at least one of the power grid, the battery, and an electric load. The processor may be configured to determine, based on the first sensing information, the second sensing information, and the third sensing information, power storage information of the battery, photovoltaic power supply information of the photovoltaic system, and power grid power supply information of the power grid, respectively; determine the target object that needs to be charged based on the power pile; determine, based on at least one of the power storage information, the photovoltaic power supply information, and the power grid power supply information, a source object charging the target object, the source object including at least one of the power grid, the photovoltaic system, and the battery; and control the charging pile to transmit, based on the source object, power to the target object.

One or more embodiments of the present disclosure provide a method for charging. The method may be executed by a processor in a device for charging. The method may include determining, based on first sensing information, second sensing information, and third sensing information, power storage information of a battery connected with a charging pile, photovoltaic power supply information of a photovoltaic system connected with the charging pile, and power grid power supply information of a power grid connected with the charging pile, respectively. The first sensing information may include power situation information of the battery obtained through a first sensor of the device for charging, the second sensing information may include power situation information of the photovoltaic system obtained through a second sensor of the device for charging, and the third sensing information may include power situation information of the power grid obtained through a third sensor of the device for charging; determining a target object that needs to be charged based on the charging pile, the target object including at least one of the power grid, the battery, and the electric load; determining, based on at least one of the power storage information, the photovoltaic power supply information, and the power grid power supply information, a source object charging the target object, the source object including at least one of the power grid, the photovoltaic system, and the battery; and controlling the charging pile to transmit, based on the source object, power to the target object.

One or more embodiments of the present disclosure also provide a non-transitory computer-readable storage medium storing computer instructions that, when executed by at least one processor, direct the at least one processor to perform the method for charging.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is a flowchart illustrating an exemplary process for charging according to some embodiments of the present disclosure;

FIG. 4 is a flowchart illustrating an exemplary process for determining a source object according to some embodiments of the present disclosure;

FIG. 5 is a flowchart illustrating an exemplary process for determining a target object according to some embodiments of the present disclosure;

FIG. 6 is a flowchart illustrating an exemplary process for determining an output power according to some embodiments of the present disclosure;

FIG. 7 is a flowchart illustrating an exemplary process for determining a preset saturation capacity according to some embodiments of the present disclosure.

DETAILED DESCRIPTION

Figure 1:
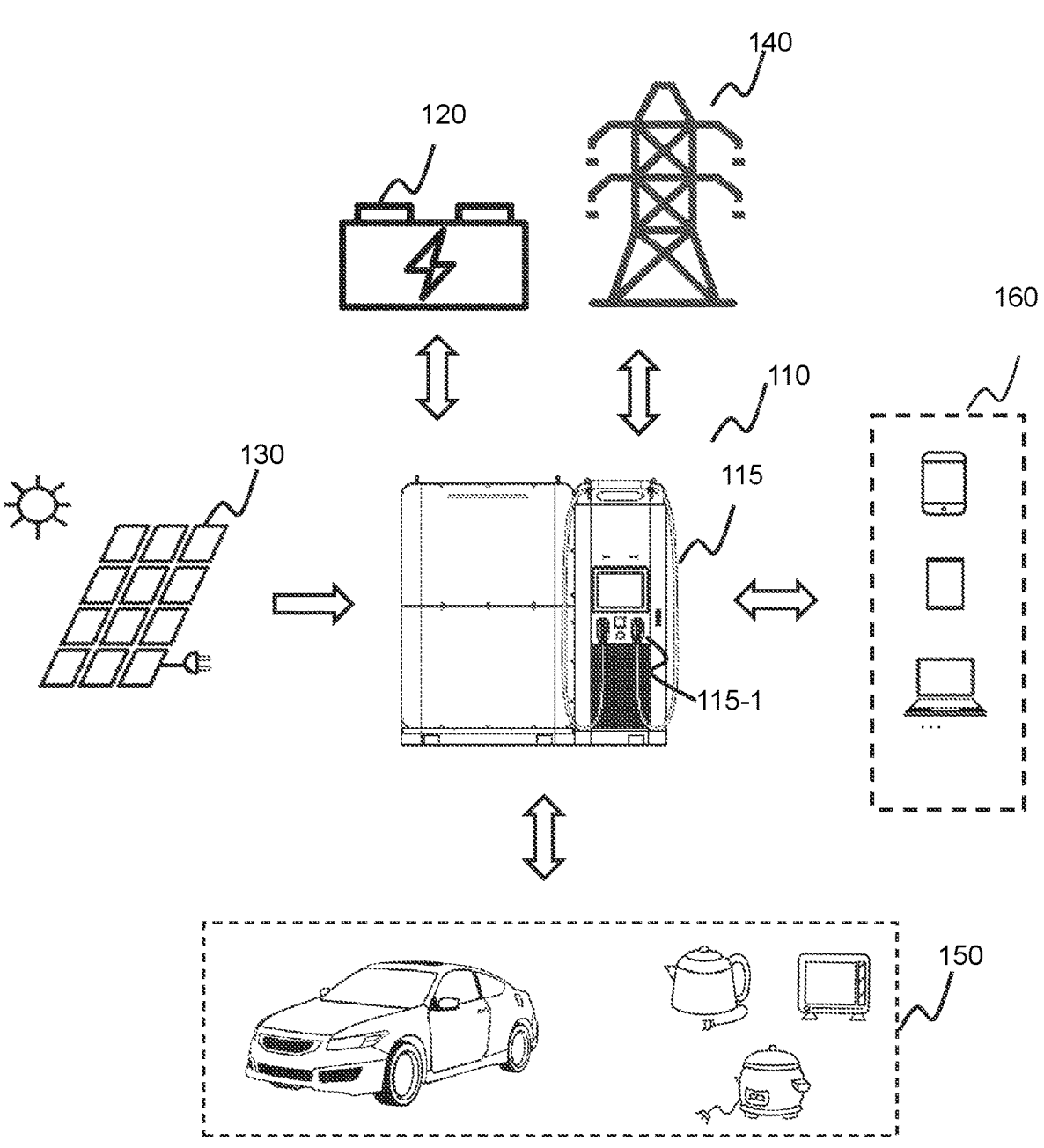
FIG. 1 is a schematic diagram illustrating an application scenario of an exemplary system for charging according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It should be understood that the "system," "device," "unit," and/or "module" as used herein is a method for distinguishing different components, elements, units, portions, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that the system implements according to some embodiments of the present disclosure. It is to be expressly understood, the operations of the flowcharts may be implemented not in order. Instead, various operations may be processed in reverse order or simultaneously. At the same time, other operations may be added to these procedures, or a certain operation or operations may be removed from these procedures.

FIG. 1 is a schematic diagram illustrating an application scenario of an exemplary system for charging according to some embodiments of the present disclosure.

In some embodiments, an application scenario 100 of a system for charging (also referred to as a "charging system") may include a device for charging 110 (also referred to as a "charging device 110"), a battery 120, a photovoltaic system 130, a power grid 140, an electric load 150, and a terminal 160.

Figure 2:
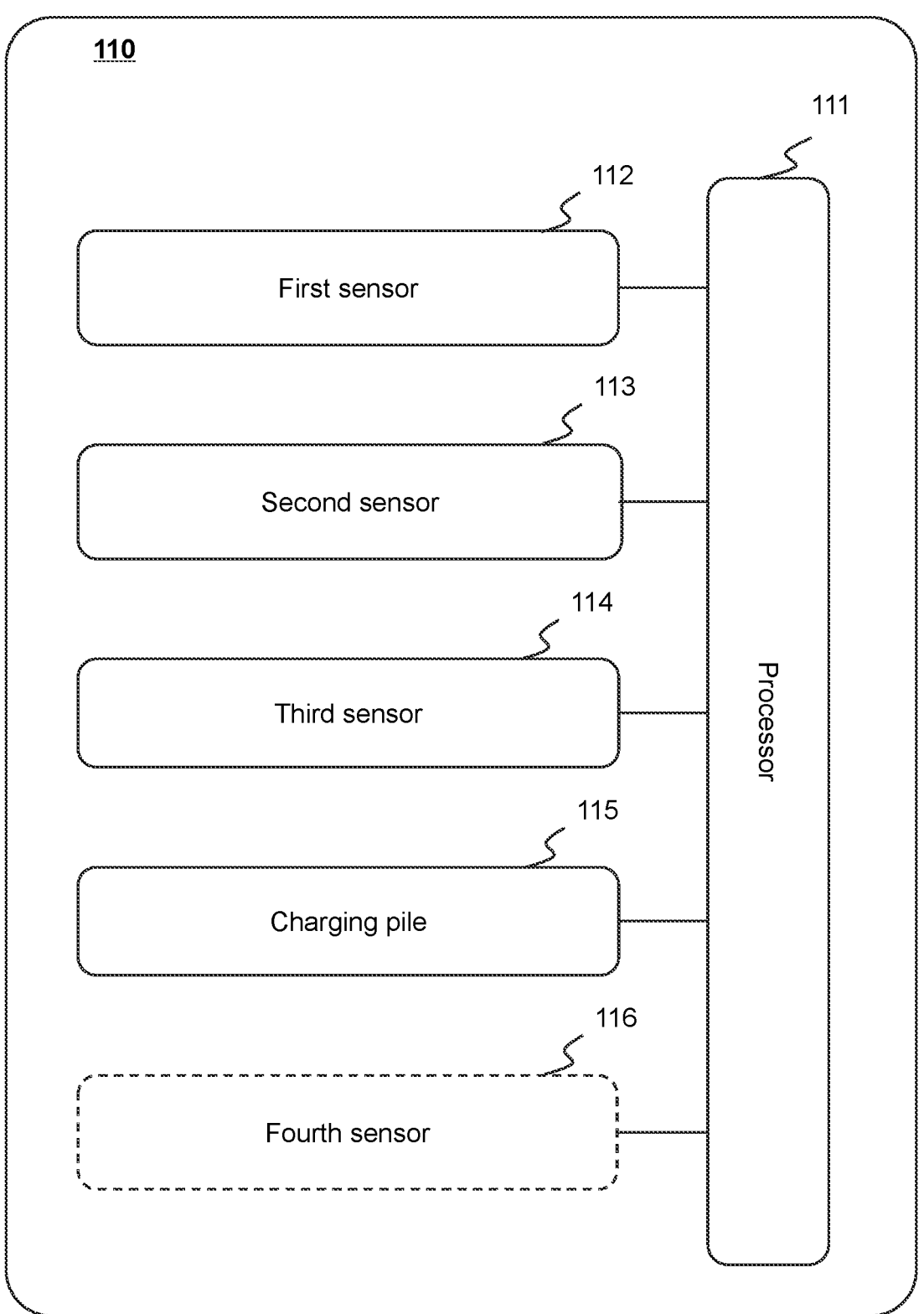
FIG. 2 is a schematic diagram illustrating an exemplary device for charging according to some embodiments of the present disclosure.

The charging device 110 may be configured to implement the method for charging (also referred to as a "charging method") described in some embodiments of the present disclosure. In some embodiments, as shown in FIG. 2, the charging device 110 may include a processor 111, a first sensor 112, a second sensor 113, a third sensor 114, a charging pile 115, and a fourth sensor 116. The processor 111 may process data, information and/or a processing result obtained from other devices or other data sources in the application scenario 100 of the charging system, and execute program instructions based on the data, information and/or processing result, to perform one or more functions described in the present disclosure. For example, the processor 111 of the charging device 110 may determine, based on first sensing information, second sensing information, and third sensing information, power storage information of a battery connected with the charging pile, photovoltaic power supply information of a photovoltaic system connected with the charging pile, and power grid power supply information of the power grid connected with the charging pile, respectively; determine a target object that needs to be charged based on the charging pile; determine, based on at least one of the power storage information, the photovoltaic power supply information, and the power grid power supply information, a source object charging the target object; and control the charging pile to transmit, based on the source object, power to the target object. More descriptions regarding the above embodiment may be found elsewhere in the present disclosure. See, e.g., FIG. 3 and relevant descriptions thereof.

The charging pile 115 may be connected with a source object (e.g., at least one of the battery 120, the photovoltaic system 130, and the power grid 140) to obtain power from the source object. The charging pile 115 may be further connected with the target object (e.g., at least one of the battery 120, the power grid 140, and the electric load 150) to transmit power to the target object. It should be noted that the charging pile 115 may charge the electric load 150 through a charger 115-1. In addition, the charging device 110 may also regulate a flow direction and a connection relationship of circuits in the charging pile 115 to transmit the power to the battery 120 and the power grid 140. In some embodiments, the charging pile 115 may also be configured independently from the charging device 110. When the charging pile 115 is configured independently from the charging device 110, the charging device 110 may be connected with the charging pile 115 and control the charging pile 115 to transmit the power to the target object through the source object. More descriptions regarding the charging device 110 may be found elsewhere in the present disclosure. See, e.g., FIG. 2 and relevant descriptions thereof.

The battery 120 may store power from the photovoltaic system 130 and/or the power grid 140. For example, the battery 120 may store 233 kWh of power from the photovoltaic system 130 and/or the power grid 140. The charging device 110 of the charging pile may control an energy storage and/or an energy discharge of the battery 120. For example, the charging device 110 may control the battery 120 to transmit the power to the power grid 140 and/or the electric load 150 through the charging pile 115.

The photovoltaic system 130 may be configured to convert a solar radiation energy into power. For example, a photovoltaic panel in the photovoltaic system 130 may have an area of 20 m². When the photovoltaic system 130 is in use and the photovoltaic panel is irradiated with light of 1000 Lux, the photovoltaic system 130 may provide power of about 10 kW for the target object in real-time. The charging device 110 may control the energy discharge of the photovoltaic system 130. For example, the charging device 110 may control the photovoltaic system 130 to transmit the power to one or more of the battery 120, the power grid 140, and the electric load 150 through the charging pile 115.

The power grid 140 refers to an electrical system configured to transmit and distribute power. The charging device 110 may control the energy discharge of the power grid 140. In some embodiments, the charging device 110 may also obtain a grid connection demand of the power grid 140 and supply power to the power grid 140 through the source object (e.g., the photovoltaic system 130).

The electric load 150 may at least include a load powered by power. For example, the electric load 150 may include an electric vehicle, a hybrid vehicle, etc. that use the power as a power source. As another example, in a certain circumstances (such as a circumstance of extreme weather), when the power grid 140 is unable to supply power to household appliances (such as microwave ovens, washing machines, etc.), a user (such as the user of the household appliances) may connect the household appliances with the charging device 110. In such cases, the electric load 150 may also include the household appliances. The charging device 110 may control the source object to supply power to the electric load 150.

The terminal 160 may be configured to receive and/or send information related to the charging device 110 to realize a human-computer interaction. For example, the terminal 160 may include a display (not shown in the figure) of the charging pile 115. As another example, the terminal 160 may include a vehicle machine of a vehicle, a mobile device of the user, etc. The terminal 160 may communicate with the charging device 110 through a network (not shown in the figure). The user may obtain relevant charging information (e.g., a charging progress) or send a charging demand to the charging device 110 through the terminal 160.

It should be noted that the above descriptions of the application scenario 100 of the charging system are only for description and are not intended to limit the scope of the present disclosure. It should be understood that for those skilled in the art, after understanding the principle of the system, it is possible to combine various components arbitrarily, or form a subsystem to connect with other components without departing from this principle. In some embodiments, the application scenario 100 of the charging system may also include other components, for example, a management system of the battery 120 and a grid-connected and off-grid inverter (hereinafter referred to as "inverter"). The management system of the battery 120 may be configured to monitor a status of the battery 120 (e.g., a charge and discharge status of the battery 120, a service life of the battery 120, etc.). The inverter may be configured as a converter for converting the power provided by the photovoltaic system 130 into an alternative current that meets the grid connection demand of the power grid 140.

FIG. 2 is a schematic diagram illustrating an exemplary device for charging according to some embodiments of the present disclosure.

As shown in FIG. 2, the charging device 110 may include the processor 111, the first sensor 112, the second sensor 113, the third sensor 114, and the charging pile 115.

The first sensor 112 may be configured to obtain the first sensing information from the battery 120 connected with the charging pile 115. For example, the first sensor 112 may be one or a combination of an electric meter, a power sensor, etc. connected with the battery 120. The first sensor 112 may continuously collect the first sensing information of the battery 120 based on a preset time point or time interval. More descriptions regarding the first sensing information may be found elsewhere in the present disclosure. See, e.g., FIG. 3 and relevant descriptions thereof.

The second sensor 113 may be configured to obtain second sensing information from the photovoltaic system 130 connected with the charging pile 115. For example, similar to the first sensor 112, the second sensor 113 may be one or a combination of an electric meter, a power sensor, etc. connected with the photovoltaic system 130. The second sensor 113 may continuously collect the second sensing information of the photovoltaic system 130 based on a preset time point or time interval. More descriptions regarding the second sensing information may be found elsewhere in the present disclosure. See, e.g., FIG. 3 and relevant descriptions thereof.

The third sensor 114 may be configured to obtain third sensing information from the power grid 140 connected with the charging pile 115. For example, similar to the first sensor 112, the third sensor 114 may be one or a combination of an electric meter, a power sensor, etc. connected with the power grid 140. The third sensor 114 may continuously collect the third sensing information of the power grid 140 based on a preset time point or time interval. More descriptions regarding the third sensing information may be found elsewhere in the present disclosure. See, e.g., FIG. 3 and relevant descriptions thereof.

In some embodiments, the charging device 110 may further include a fourth sensor 116. The fourth sensor 116 may be configured to obtain fourth sensing information from the electric load 150 connected with the charging pile 115. For example, similar to the first sensor 112, the fourth sensor 116 may be one or a combination of an electric meter, a power sensor, etc. connected with the power grid 140. The fourth sensor 116 may continuously collect the fourth sensing information of the electric load 150 based on a preset time point or time interval. More descriptions regarding the fourth sensing information may be found elsewhere in the present disclosure. See, e.g., FIG. 3 and relevant descriptions thereof.

The charging pile 115 may be configured to transmit power to a target object. The charging pile 115 may transmit the power to the electric load 150 through the charger 115-1. The charging pile 115 may also regulate a flow direction and a connection relationship of circuits inside the charging pile 115 to transmit power to the battery 120 and the power grid 140. In some embodiments, the charging pile 115 may also be configured to provide the target object with a required current.

In some embodiments, the charging pile 115 may include at least one alternating current (AC)/direct current (DC) module and at least one DC/DC module. For example, the charging pile 115 may include two AC/DC modules and five DC/DC modules. The AC/DC modules may be configured to convert an AC voltage to a DC voltage. For example, when the power is transmitted to the battery 120 or the electric load 150 through the power grid 140, the charging pile 115 may convert the current output by the power grid 140 based on the AC/DC module to ensure a normal operation of the power transmission. The DC/DC module may be configured to convert a DC voltage into a DC voltage that meets a preset demand. For example, when the battery 120 or the photovoltaic system 130 transmits power to the electric load 150, the charging pile 115 may convert the current output by the battery 120 or the photovoltaic system 130 based on the DC/DC module to ensure the normal operation of the power transmission.

The processor 111 may be configured to analyze and process relevant data/information from various components in the charging device 110 or an external data source, and receive/send relevant instructions to control the various components in the charging device 110. In some embodiments, the processor 111 may be in communication with the first sensor 112, the second sensor 113, the third sensor 114, and the charging pile 115. The processor 111 may include one or more sub-processing devices (e.g., a single-core processing device or a multi-core processing device). The processor 111 may be implemented based on various hardware and/or software manners.

In some embodiments, the processor 111 may be configured to determine, based on the first sensing information, the second sensing information, and the third sensing information, power storage information of the battery, photovoltaic power supply information of the photovoltaic system, and power grid power supply information of the power grid, respectively; determine the target object that needs to be charged based on the power pile; determine, based on at least one of the power storage information, the photovoltaic power supply information, and the power grid power supply information, a source object charging the target object, the source object including at least one of the power grid, the photovoltaic system, and the battery; and control the charging pile to transmit, based on the source object, power to the target object.

In some embodiments, the processor 111 may be further configured to obtain power supply priorities of a plurality of candidate source objects. The plurality of candidate source objects may include the power grid, the photovoltaic system, and the battery. The processor 111 may be further configured to determine the source object that meets a charging demand of the target object from the plurality of candidate source objects by processing, based on the plurality of power supply priorities, power supply information corresponding to the plurality of candidate source objects. The power supply information corresponding to the battery may be the power storage information, the power supply information corresponding to the photovoltaic system may be the photovoltaic power supply information, and the power supply information corresponding to the power grid may be the power grid power supply information.

In some embodiments, the processor 111 may be further configured to determine battery charging demand information of the battery based on the first sensing information; determine grid connection demand information of the power grid based on the third sensing information, wherein the grid connection demand information may be used to indicate demand information that the power grid needs to transmit power together with the source object; determine load charging demand information of the electric load based on the fourth sensing information; and determine the target object based on the battery charging demand information, the load charging demand information, and the grid connection demand information.

In some embodiments, the processor 111 may also be configured to determine, based on a charging demand of the target object and power supply information of the source object, an output power when the source object supplies power to the target object. The power supply information corresponding to the battery may be the power storage information, the power supply information corresponding to the photovoltaic system may be the photovoltaic power supply information, and the power supply information corresponding to the power grid may be the power grid power supply information.

In some embodiments, when the target object includes the battery and other objects, the processor 111 may be further configured to determine a saturation capacity of the battery within a target time period; and determine, based on the saturation capacity, the charging demand, and the power supply information, a plurality of output powers each of which is when the source object supplies power to the battery and one or more output powers when the source object supplies power to the one or more other objects within one of a plurality of sub-time periods of the target time period.

In some embodiments, the processor 111 may be further configured to determine estimated charging demand information of an estimated electric load, estimated photovoltaic power supply information of the photovoltaic system, and estimated power grid power supply information and estimated grid connection demand information of the power grid within the target time period; and determine the saturation capacity of the battery within the target time period based on the estimated charging demand information, the estimated photovoltaic power supply information, the estimated power grid power supply information, and the estimated grid connection demand information.

In some embodiments, the processor 111 may also be configured to obtain historical charging demand information of a historical electric load and historical grid connection demand information of the power grid within a historical time period; and determine a time duration of the target time period based on the historical charging demand information and the historical grid connection demand information.

More descriptions regarding the processor 111 may be found elsewhere in the present disclosure. See, e.g., FIG. 3 to FIG. 8 and relevant descriptions thereof.

It should be noted that the above description of the charging device 110 is only for description, and is not intended to limit the scope of the present disclosure. It should be understood that for those skilled in the art, after understanding the principle of the device, it is possible to make any combination of the various components in the charging device 110 or to form sub-components to connect with other device components without departing from this principle.

FIG. 3 is a flowchart illustrating an exemplary process for charging according to some embodiments of the present disclosure. In some embodiments, a process 300 may be executed by the processor 111. As shown in FIG. 3, the process 300 includes the following operations.

In 310, power storage information of a battery, photovoltaic power supply information of a photovoltaic system, and power grid power supply information of a power grid connected with a charging pile may be determined respectively based on the first sensing information, the second sensing information, and the third sensing information.

The first sensing information refers to power situation information of the battery 120 connected with the charging pile 115. The first sensing information may at least include a current storage capacity of the battery 120. The first sensing information may also include other power information of the battery 120. For example, the first sensing information may include a voltage, a current, an output power, a battery percentage, a total battery capacity, etc. when the current battery 120 is used for power supply. As another example, the first sensing information may also include a saturation capacity, a minimum reserved capacity, etc. of the battery 120. More descriptions regarding the saturation capacity may be found elsewhere in the present disclosure. See, e.g., FIG. 7 and relevant descriptions thereof. More descriptions regarding the minimum reserved capacity may be found elsewhere in the present disclosure. See, e.g., the embodiments described below in the present disclosure. As another example, the first sensing information may also include a remaining electricity supply time if the battery 120 is used for the power supply.

The processor 111 may obtain the first sensing information from the battery 120 based on the first sensor 112. More descriptions regarding the obtaining of the first sensing information by the first sensor 112 may be found elsewhere in the present disclosure. See, e.g., FIG. 2 and relevant descriptions thereof.

The power storage information may be power information related to a power storage of the battery 120. The processor 111 may obtain the power information related to the power storage from the first sensing information, and use the power information as the power storage information of the battery 120. For example, the processor 111 may obtain the current storage capacity of the battery 120 from the first sensing information, and use the current storage capacity of the battery 120 as the power storage information of the battery 120.

The second sensing information refers to the power situation information of the photovoltaic system 130 connected with the charging pile 115. The second sensing information may at least include a current power when the photovoltaic system 130 supplies power. The second sensing information may also include other power information of the photovoltaic system 130. For example, the second sensing information may also include a voltage, a current, etc. when the current photovoltaic system 130 supplies power. As another example, the second sensing information may also include an estimated power outage time of the photovoltaic system 130.

The processor 111 may obtain the second sensing information from the photovoltaic system 130 based on the second sensor 113. More descriptions regarding the obtaining of the second sensing information by the second sensor 113 may be found elsewhere in the present disclosure. See, e.g., FIG. 2 and relevant descriptions thereof.

The photovoltaic power supply information refers to the power information related to the power supply of the photovoltaic system 130. The processor 111 may obtain the power information related to the power supply from the second sensing information, and use the power information as the photovoltaic power supply information of the photovoltaic system 130. For example, the processor 111 may obtain, from the second sensing information, a current power and a voltage of the photovoltaic system 130 when the photovoltaic system 130 supplies power, and use the current power and the voltage as the photovoltaic power supply information of the photovoltaic system 130.

The third sensing information refers to the power situation information of the power grid 140 connected with the charging pile 115. The third sensing information may at least include an output power when the power grid 140 supplies power. The third sensing information may also include other power information of the power grid 140. For example, the third sensing information may also include a voltage, a current, etc. when the power grid 140 supplies power. As another example, the third sensing information may also include an electricity price and an electric load of the power grid 140.

The processor 111 may obtain the third sensing information from the power grid 140 based on the third sensor 114. More descriptions regarding obtaining the third sensing information by the third sensor 114 may be found elsewhere in the present disclosure. See, e.g., FIG. 2 and relevant descriptions thereof.

The power grid power supply information may refer to the power information related to the power supply of the power grid 140. The processor 111 may obtain the power information related to the power supply from the third sensing information, and use the power information as the power grid power supply information of the power grid 140. For example, the processor 111 may obtain, from the third sensing information, a power and a voltage of the power grid 140 when the power grid 140 supplies power, and use the power and the voltage as the power grid power supply information of the power grid 140.

In 320, a target object that needs to be charged based on the charging pile may be determined.

The target object refers to an object to which the power is transmitted based on the charging pile 115. The target object may include at least one of the power grid 140 connected with the charging pile 115, the electric load 150 that needs to be charged by the charging pile 115, and the battery 120 in the charging pile 115.

It should be noted that when the electric load of the power grid 140 is too high, the power grid 140 may send grid connection demand information indicating that the power grid 140 needs to transmit the power together with the source object to supplement the energy of the power grid 140, thereby ensuring a stable power supply of the power grid 140. In such cases, the power grid 140 may also be the target object. More descriptions regarding the grid connection demand information may be found elsewhere in the present disclosure. See, e.g., FIG. 5 and relevant descriptions thereof.

In some embodiments, the processor 111 may receive a charging demand sent to the charging device 110 by the user (e.g., a manager of the charging device 110) through the terminal 160, and determine the target object based on the charging demand. For example, the processor 111 may receive the charging demand sent by the user to the charging device 110 through the terminal 160. The charging demand may indicate charging the battery 120. Further, the processor 111 may determine that the target object includes the battery 120.

In some embodiments, the processor 111 may also analyze and process obtained data to determine the target object. The obtained data may include, for example, one or more of the first sensing information, the second sensing information, the third sensing information, and the fourth sensing information. In some embodiments, the processor 111 may determine the battery charging demand information of the battery based on the first sensing information. The processor 111 may further determine grid connection demand information of the power grid based on the third sensing information. The grid connection demand information may be used to indicate demand information that the power grid needs to transmit power together with the source object. Further, the processor 111 may determine load charging demand information of the electric load based on the fourth sensing information. The fourth sensing information may be power situation information of the electric load obtained through the fourth sensor in the charging device. Further, the processor 111 may determine the target object based on the battery charging demand information, the load charging demand information, and the grid connection demand information. More descriptions regarding the above embodiments may be found elsewhere in the present disclosure. See, e.g., FIG. 5 and relevant descriptions thereof.

In 330, a source object charging the target object may be determined based on at least one of the power storage information, the photovoltaic power supply information, and the power grid power supply information.

The source object refers to an object that provides power to the target object. In some embodiments, the source object may include at least one of the power grid 140, the photovoltaic system 130, and the battery 120. It should be understood that the source object may not supply power to itself, but may serve as a target object to receive power output from other source objects. For example, the battery 120 may output and receive power simultaneously.

In some embodiments, the processor 111 may analyze and process at least one of the power storage information, the photovoltaic power supply information, and the power grid power supply information, and determine the source object charging the target object.

The processor 111 may determine, based on at least one of the power storage information, the photovoltaic power supply information, and the power grid power supply information, a possibility of each of a plurality candidate source objects supplying the power, thereby determining the source object charging the target object. The candidate source object refers to the object that may supply power for the target object. The candidate source object may include the power grid 140, the photovoltaic system 130, and the battery 120. The processor 111 may determine whether the photovoltaic power supply information satisfies a first preset condition, the power storage information satisfies a second preset condition, and the power grid power supply information satisfies a third preset condition respectively, and determine the possibility of each candidate source object supplying the power. The first preset condition, the second preset condition, and the third preset condition may respectively be preset conditions representing that the photovoltaic system 130, the battery 120, and the power grid 140 may supply power. For example, the first preset condition may include that output power of the photovoltaic system 130 is greater than or equal to a first electricity threshold (e.g., 10 kW). When the photovoltaic power supply information does not satisfy the first preset condition, which indicates that the photovoltaic system 130 may not supply power for the target object, the processor 111 may determine that the source object does not include the photovoltaic system 130. When the photovoltaic power supply information satisfies the first preset condition, which indicates that the photovoltaic system 130 has power, the processor 111 may determine that the photovoltaic system 130 has the possibility of supplying power. As another example, the second preset condition may include that the storage capacity of the battery 120 in the power storage information is greater than or equal to a minimum reserved capacity. When the power storage information does not satisfy the second preset condition, which indicates that the battery 120 has no power or has a power too low to supply power for the target object, the processor 111 may determine that the source object does not include the battery 120. When the power storage information satisfies the second preset condition, which indicates that the photovoltaic system 130 has power, the processor 111 may determine that the battery 120 has the possibility of supplying power. As another example, the third preset condition may include that the voltage of the power grid 140 in the power grid power supply information is greater than a threshold, and a deviation rate value of the voltage satisfies a deviation value. The threshold and the deviation value may be determined based on a local industrial voltage standard. When the power grid power supply information does not satisfy the third preset condition, which indicates that the power grid 140 may not supply power for the target object, the processor 111 may determine that the source object does not include the power grid 140. When the power supply information of the power grid satisfies the third preset condition, which indicates that the power grid 140 has power, the processor 111 may determine that the power grid 140 has the possibility of supplying power.

In some embodiments, the processor 111 may determine all candidate source objects that have the possibility of supplying power as the source objects. In some embodiments, the processor 111 may determine the object with a higher power supply priority among a plurality of power supply priorities of a plurality of candidate source objects as the source object. More descriptions regarding the power supply priorities may be found elsewhere in the present disclosure. See, e.g., FIG. 4 and relevant descriptions thereof.

In some embodiments, the processor 111 may obtain the plurality of power supply priorities of the plurality of candidate source objects; and process, based on the plurality of power supply priorities, power supply information corresponding to the plurality of candidate source objects. Further, the processor 111 may determine the source object that meets the charging demand of the target object from the plurality of candidate source objects. More descriptions regarding the above embodiments may be found elsewhere in the present disclosure. See, e.g., FIG. 4 and relevant descriptions thereof.

In some embodiments, when none of the plurality of candidate source objects has the possibility of supplying power, the processor 111 may determine that there is no source object. When there is no source object, the processor 111 may remind the user (e.g., the user of the electric load 150) that the current charging pile may not supply power. For example, the processor 111 may send relevant information to a pre-bound user terminal to remind the user that the current charging pile may not supply power.

In 340, the charging pile may be controlled to transmit power to the target object based on the source object.

In some embodiments, the processor 111 may control the charging pile 115 to transmit power to the target object based on the source object. For example, the processor 111 may control the charging pile 115 to transmit power to the battery 120 based on the photovoltaic system 130. When the source object includes the photovoltaic system 130, the charging pile 115 may match one or more charging parameters of the target object (e.g., a voltage and a power required by the target object) based on an inverter such that the DC power of the photovoltaic system 130 may be adjusted to AC power that meets the charging demands of the target object. In such cases, the charging pile 115 may charge the target object. It should be understood that since the photovoltaic system 130 may be affected by the weather, a stability of the power generated by the photovoltaic system 130 may be relatively poor. In such cases, the power generated by the photovoltaic system 130 may be processed by the inverter before transmitted to the target object to maintain the stability of the power transmitted to avoid damage to the target object. When the battery 120 or the power grid 140 transmits power, an output power is relatively stable. In such cases, the power may be directly transmitted to the target object.

In some embodiments, the processor 111 may control the charging pile 115 to charge, based on a charging priority of the target object, the target object through the source object. The charging priority refers to a priority order in which different target objects are charged. The priority order may be a charging order, and the target object with the highest charging priority may be charged first. The priority order may also be an allocation priority order for outputting power to the source object, and the source object may transmit a higher power to the target object with the highest charging priority.

The charging priority may be determined in various manners. The charging priority may be preset. For example, the manager of the charging device 110 may directly set the electric load 150 to have the highest charging priority. That is, the electric load 150 may be charged first. In some embodiments, the charging priority may also be determined based on the operating mode of the charging pile 115. The operating mode may be a mode set according to the operation needs of the charging pile 115. The charging priorities of different target objects in different operating modes may be different. For example, the operating modes may include an automatic mode, an energy-saving mode, a fast charging mode, etc. The automatic mode refers to a mode for balancing an operating cost of the charging pile 115 and the power demand of the electric load 150. The energy-saving mode refers to a mode in which the operating cost of the charging pile 115 is a priority. The fast charging mode refers to a mode in which the power demand of the electric load 150 is a priority. In the energy-saving mode, the electric load 150 may be set to have the highest charging priority. In the automatic mode or the energy-saving mode, the target object with the highest charging priority may be adjusted in real time according to a current situation. For example, the target object with the highest charging priority in the energy-saving mode may be the battery 120.

In some embodiments, the processor 111 may determine, based on a charging demand of the target object and power supply information of the source object, an output power when the source object supplies power to the target object. More descriptions regarding the charging demand of the target object may be found elsewhere in the present disclosure. See, e.g., FIG. 4 and relevant descriptions thereof. In some embodiments, the processor 111 may determine an input power of the target object based on the charging demand; determine an output power of the source object based on the power supply information of the source object; and determine a difference between the output power and a sum of the input power and a useless power corresponding to the source object. When the difference is less than or equal to 0 kW, the processor 111 may determine that the source object transmits power to the target object based on the output power of the source object. When the difference is greater than 0 kW, the processor 111 may determine that the source object transmits power to the target object based on the sum of the input power and the useless power corresponding to the source object.

In some embodiments, when the difference between the output power and the sum of the input power and the useless power corresponding to the source object is greater than 0 kW and there are a plurality of source objects, the processor 111 may determine the output power of each of the plurality of source objects based on the plurality of power supply priorities of the plurality of source objects. For example, the processor 111 may determine the output power of each of the plurality of source objects based on a corresponding relationship between a power supply priority and an output power. For example, the corresponding relationship between the power supply priority and the output power may include that a ratio of the output power of the source object with the highest power supply priority to the output power of the source object with a lower power supply priority is 0.7:0.3. When the sum of the input power and the useless power corresponding to the source object is P1, the processor 111 may determine that the output power of the source object with the highest power supply priority is bold 0.7P1 and the output power of the source object with a lower power supply priority is 0.3P1.

In some embodiments, when the difference between the output power and the sum of the input power and the useless power corresponding to the source object is less than 0 kW and there are a plurality of target objects, the processor 111 may determine, based on a plurality of charging priorities of the plurality of target objects, the output power of the source target transmitting power to each of the plurality of target objects. For example, the processor 111 may determine, based on a corresponding relationship between a charging priority and an input power, the input power of each of the plurality of target objects. For example, a corresponding relationship between the charging priority and the input power may include that a ratio of the input power of the source object with the highest charging priority to the input power of the source object with a lower charging priority is 0.6:0.4. When the sum of the input power and the useless power corresponding to the source object is P2, the processor 111 may determine that the input power of the source object with the highest power supply priority is 0.6P2 and the input power of the source object with a lower power supply priority is 0.4P2.

In some embodiments, when the target object includes the battery 120 and other objects, the processor 111 may determine a saturation capacity of the battery within a target time period. Further, the processor 111 may determine, based on the preset saturation capacity, the charging demand, and the power supply information, an output power when the source object supplies power to the battery within a target time period and an output power when the source object supplies power to the other objects. More descriptions regarding the above embodiments may be found elsewhere in the present disclosure. See, e.g., FIG. 6 and relevant descriptions thereof.

In some embodiments, the processor 111 may also control the charging pile 115 to stop transmitting power to the target object. For example, when the target object is the battery 120, the processor 111 may obtain the power storage information of the battery 120 in real time based on the first sensing information. When the power storage information indicates that the power storage capacity is equal to a total battery capacity of the battery 120, the processor 111 may control the charging pile 115 to stop transmitting power to the battery 120.

In some embodiments, when the source object includes the battery 120, the processor 111 may also obtain the power storage information of the battery 120 in real time. When the power storage information of the battery 120 indicates that the power storage capacity of the battery 120 is less than or equal to a minimum reserved capacity, the power supply of the battery 120 may be stopped. The minimum reserved power refers to the minimum power of the battery 120 to support and ensure a normal operation of the charging system. For example, the minimum reserved power may be 10% of a maximum power. As used herein, the maximum power refers to a capacity of the battery 120 when the battery 120 is fully charged. The minimum reserved power may be preset based on parameters of the battery 120 or the actual needs.

It should be noted that when the power storage information of the battery 120 indicates that the power storage capacity of the battery 120 is less than or equal to the minimum reserved capacity, it indicates that due to a continuous power supply to the outside, the storage capacity of the battery 120 is low. To ensure the normal operations of the charging pile 115 and the battery 120, the processor 111 may control the battery 120 to stop supplying power to the target object such that the battery 120 may be used as a backup power source to maintain the normal operation of the charging device 110.

According to some embodiments of the present disclosure, the source object may be determind based on at least one of the power storage information, the photovoltaic power supply information, and the power grid power supply information, and the charging pile 115 may be controlled to transmit power to the target object based on the source object. The method may be adapted to different application scenarios and realize an automatic switching of the source objects such that the charging pile 115 may be controlled to realize the charging in different modes. In such cases, the charging demand of the target object is satisfied, and an operating mode of the charging pile 115 may be adjusted according to the operating mode of the charging pile 115, which may realize an intelligent utilization and management of charging energy of the charging pile 115.

FIG. 4 is a flowchart illustrating an exemplary process for determining a source object according to some embodiments of the present disclosure. In some embodiments, a process 400 may be executed by the processor 111. As shown in FIG. 4, process 400 includes the following operations.

In 410, a plurality of power supply priorities of a plurality of candidate source objects may be obtained.

The power supply priority refers to a priority order of using different source objects for the power supply. The source object with the highest charging priority may be preferentially used for the power supply. In some embodiments, the power supply priority of the photovoltaic system 130 may be the highest power supply priority, which indicates that the photovoltaic system 130 is preferentially used for the power supply to reduce an operating cost of the charging pile 115.

Similar to the charging priority, the power supply priority may be determined in various manners. For example, the power supply priority may be set by a system default, or may be set according to historical experience or a current actual demand. In some embodiments, the power supply priority may be determined based on an operating mode of the charging pile 115. For example, the source object with the highest power supply priority in an energy-saving mode may be the photovoltaic system 130, and the power supply priority of the battery 120 is lower than that of the photovoltaic system 130 and higher than that of the power grid 140.

In 420, the source object that meets a charging demand of the target object may be determined from the plurality of candidate source objects by processing, based on the plurality of power supply priorities, power supply information corresponding to the plurality of candidate source objects.

The charging demand of the target object may include one or more of an electricity demand, a power demand, a voltage demand, etc., of the target object. The charging demand of the target object may include at least one of charging demand information of the battery 120, load charging demand information of the electric load 150, and grid connection demand information of the power grid 140. For example, when the target object is the battery 120, the processor 111 may determine the charging demand of the battery 120 based on the charging demand information of the battery 120. The charging demand may include the electricity demand and the power demand of the battery 120.

More descriptions regarding the charging demand information, the load charging demand information, and the grid connection demand information may be found elsewhere in the present disclosure. See, e.g., FIG. 5 and relevant descriptions thereof.

The processor 111 may obtain the charging demand of the target object in various manners. For example, when the target object includes the battery 120, the processor 111 may obtain the charging demand of the battery 120 based on the first sensing information. As another example, the processor 111 may obtain the charging demand input by a user through the terminal 160.

In some embodiments, the processor 111 may first determine whether a candidate source object with the highest priority has a possibility of supplying power based on the power supply information of the candidate source object with the highest priority. When the candidate source object with the highest priority has no possibility of supplying power, the processor 111 may sequentially determine whether the candidate source objects with lower priorities have the possibility of supplying power until that a candidate source object with the possibility of supplying power is determined or none of the source objects having the possibility of supplying power is determined. More descriptions regarding determining the possibility of a candidate source object supplying power may be found elsewhere in the present disclosure. See, e.g., FIG. 3 and relevant descriptions thereof. For example, when an order of the power supply priorities is the photovoltaic system 130, the battery 120, and the power grid 140 in sequence, the processor 111 may first determine the possibility of the photovoltaic system 130 supplying power based on the photovoltaic power supply information of the photovoltaic system 130. When the photovoltaic system 130 does not have the possibility of supplying power, the processor 111 may determine the possibility of the battery 120 and the power grid 140 supplying power one by one until that the candidate source object with the possibility of supplying power is determined or none of the photovoltaic system 130, the battery 120, and the power grid 140 having the possibility of supplying power is determined.

In some embodiments, the processor 111 may compare the power supply information corresponding to the candidate source object with the charging demand of the target object to determine whether the candidate source object meets the charging demand of the target object. The power supply information corresponding to the battery 120 may include the power storage information, the power supply information corresponding to the photovoltaic system 130 may include the photovoltaic power supply information, and the power supply information corresponding to the power grid 140 may include the power grid power supply information. For example, when the candidate source object includes the battery 120, the power storage information of the battery 120 is 50 kWh, and the charging demand of the target object includes that an estimated electricity demand of the target object is 65 kWh, the processor 111 may determine that the battery 120 alone cannot meet the charging demand of the target object.

In some embodiments, the processor 111 may analyze and process the power supply information corresponding to each candidate source object that has the possibility of supplying power based on the power supply priority of the candidate source object to determine whether the candidate source object meets the charging demand of the target object. When the candidate source object meets the charging demand of the target object, the processor 111 may determine the candidate source object as the source object. When the candidate source object cannot meet the charging demand of the target object, the processor 111 may analyze and process the power supply information corresponding to a candidate source object with a lower power supply priority that has the possibility of supplying power, and determine whether the two candidate sources meet the charging demand of the target object. The processor 111 may analyze and process the power supply information corresponding to the plurality of candidate source objects in sequence until one or more candidate source objects that meet the charging demand of the target object is determined.

For example, when an order of the power supply priorities is the photovoltaic system 130, the battery 120, and the power grid 140 in sequence, the processor 111 may first determine whether the photovoltaic system 130 has the possibility of supplying power based on the photovoltaic power supply information of the photovoltaic system 130. When the photovoltaic system 130 has the possibility of supplying power, the processor 111 may further determine whether the photovoltaic system 130 meets the charging demand of the target object based on the photovoltaic power supply information. When the photovoltaic system 130 alone can meet the charging demand of the target object, the processor 111 may determine that the source object includes and only includes the photovoltaic system 130. When the photovoltaic system 130 alone cannot meet the charging demand of the target object, the processor 111 may first determine whether the battery 120 has the possibility of supplying power. When the battery 120 has the possibility of supplying power, the processor 111 may further determine whether the photovoltaic system 130 and the battery 120 meet the charging demand of the target object. When the charging demand of the target object is met, the processor 111 may determine that the source object includes the photovoltaic system 130 and the battery 120. When the photovoltaic system 130 and the battery 120 cannot meet the charging demand of the target object, the processor 111 may determine whether the power grid 140 has the possibility of supplying power. When the power grid 140 has the possibility of supplying power, the processor 111 may further determine whether the photovoltaic system 130, the battery 120, and the power grid 140 can meet the charging demand of the target object. When the charging demand of the target object is met, the processor 111 may determine that the source object includes the photovoltaic system 130, the battery 120, and the power grid 140. When the charging demand of the target object is not met, the processor 111 may determine that there is no source object. When the photovoltaic system 130 does not have the possibility of supplying power, the processor 111 may determine that the source object does not include the photovoltaic system 130, and further determine whether the battery 120 has the possibility of supplying power until the processor 111 determines the source object that meets the charging demand of the target object or determines that there is no source object. More descriptions regarding the operations may be found in the aforementioned embodiments.

According to the method described in some embodiments of the present disclosure, the possibilities of a plurality of candidate source objects supplying power may be determined, and one or more source objects that meet the charging demand of the target object may be further determined, which may realize an intelligent allocation of the source objects and ensure a normal operation of the charging pile 115 in different scenarios.

FIG. 5 is a flowchart illustrating an exemplary process for determining a target object according to some embodiments of the present disclosure. In some embodiments, a process 500 may be executed by the processor 111. As shown in FIG. 5, the process 500 includes the following operations.

In 510, battery charging demand information of the battery may be determined based on the first sensing information.

The battery charging demand information refers to power information related to a charging demand of the battery 120.

The processor 111 may obtain the power information related to the charging demand from the first sensing information, and use the power information as the battery charging demand information of the battery 120. For example, the processor 111 may obtain a current storage capacity and a total battery capacity of the battery 120 from the first sensing information, and use the current storage capacity and the total battery capacity of the battery 120 as the charging demand information of the battery 120. As another example, the processor 111 may obtain the current storage capacity and a saturation capacity of the battery 120 from the first sensing information, and use the current storage capacity and the saturation capacity of the battery 120 as the charging demand information of the battery 120. More descriptions regarding the preset saturation power may be found elsewhere in the present disclosure. See, e.g., FIG. 7 and relevant descriptions thereof.

In 520, grid connection demand information of the power grid may be determined based on the third sensing information.

The grid connection demand information may indicate demand information that the power grid needs to transmit power together with a source object. It should be understood that during a peak period of a power consumption, an electric load of the power grid 140 is relatively high, and it may be difficult to maintain a stable supply of power based on an original power supply of the power grid 140. In such cases, the power grid 140 may need to transmit power together with the source object such that a power grid energy of the power grid 140 may be supplemented to implement a balance of a power grid frequency, a micro-grid power supply and/or peak-shaving and valley-filling of the power grid 140, thereby ensuring a normal operation of the power grid 140.

The grid connection demand information may include power information related to the grid connection demand of the power grid 140. The processor 111 may obtain the power information related to the grid connection demand from the third sensing information, and use the power information related to the grid connection demand as the grid connection demand information of the power grid 140. For example, the processor 111 may obtain one or more of a current electric load, a current voltage, and an output power of the battery 120 from the third sensing information, and use the one or more of the current electric load, the current voltage, and the output power as the grid connection demand information of the power grid 140.

In 530, the load charging demand information of the electric load may be determined based on the fourth sensing information.

The fourth sensing information refers to the power situation information of the electric load 150 connected with the charging pile 115. The fourth sensing information may include one or more of the capacity of the battery 120 in the electric load 150, a current remaining electricity, an electricity demand, an input power, etc. The fourth sensing information may also include other power information of the electric load 150. For example, the fourth sensing information may include the remaining usage time of the current power of the electric load 150.

The processor 111 may obtain the fourth sensing information from the electric load 150 based on the fourth sensor 116. More descriptions regarding obtaining the fourth sensing information by the fourth sensor 116 may be found elsewhere in the present disclosure. See, e.g., FIG. 2 and relevant descriptions thereof.

The load charging demand information may be information related to the charging demand of the electric load 150. The processor 111 may obtain the information related to the charging demand from the fourth sensing information, and use the information related to the charging demand as the load charging demand information of the electric load 150. For example, the processor 111 may obtain one or more of a battery capacity, a current remaining electricity, an electricity demand, an input power, etc. of the battery 120 in the electric load 150 from the fourth sensing information, and use the one or more of the battery capacity, the current remaining electricity, the power demand, the input power, etc. of the battery 120 in the electric load 150 as the load charging demand information of the load 150.

In 540, the target object may be determined based on the battery charging demand information, the load charging demand information, and the grid connection demand information.

The processor 111 may analyze and process the battery charging demand information, the load charging demand information, and the grid connection demand information to determine the target object. For example, the processor 111 may determine whether the battery charging demand information, the load charging demand information, and the grid connection demand information meets a fourth preset condition, a fifth preset condition, and a sixth preset condition, respectively, so as to determine the target object from the battery 120, the electric load 150, and the power grid 140. The fourth preset condition, the fifth preset condition, and the sixth preset condition may be preset conditions representing the need to transmit power to the battery 120, the electric load 150, and the power grid 140, respectively. For example, the fourth preset condition may include that the current storage capacity of the battery 120 in the battery charging demand information is lower than the saturation capacity. When the battery charging demand information meets the fourth preset condition, the processor 111 may determine that the target object includes the battery 120. As another example, the fifth preset condition may include that the electricity demand in the load charging demand information is greater than an electricity threshold (e.g., 0 kWh). When the load charging demand information meets the fifth preset condition, the processor 111 may determine that the target object includes the electric load 150. As another example, the sixth preset condition may include that the electric load in the grid connection demand information is greater than a load threshold, and when the grid connection demand information meets the sixth preset condition, the processor 111 may determine that the target object includes the power grid 140.

According to the method described in some embodiments of the present disclosure, the battery charging demand information, the load charging demand information, and the grid connection demand information may be analyzed and processed such that the target object may be automatically determined, which realizes an automatic control of the charging pile 115 and avoids manual determination of the target object. In addition, the processor 111 may automatically regulate the discharge and charge of the battery 120 to ensure that the storage capacity of the battery 120 is maintained within a stable range, thereby continuously supplying power for other objects.

FIG. 6 is a flowchart illustrating an exemplary process for determining an output power according to some embodiments of the present disclosure. In some embodiments, a process 600 may be performed by the processor 111. As shown in FIG. 6, process 600 includes the following operations.

In 610, a saturation capacity of the battery within a target time period may be determined.

The target time period refers to a time period during which a reserved saturation capacity of the battery 120 needs to be evaluated. For example, the target time period may be 8:00~12:00 the next day. An initial value of a time duration of the target time period may be set based on historical experience data, a system default value, etc. In some embodiments, the processor 111 may also obtain historical charging demand information of a historical electric load and historical grid connection demand information of the power grid within a historical time period and determine the time duration of the target time period based on the historical charging demand information and the historical grid connection demand information. More descriptions regarding the above embodiments may be found elsewhere in the present disclosure. See, e.g., FIG. 8 and relevant descriptions thereof.

The saturation capacity refers to an electric capacity indicating that the battery 120 has reached a saturated state. In some embodiments, the saturation capacity may be determined according to preset rules based on the total battery capacity of the battery 120. For example, the saturation capacity may be 85% of the maximum capacity. In some embodiments, the processor 111 may determine estimated charging demand information of an estimated electric load, estimated photovoltaic power supply information of the photovoltaic system 130, and estimated power grid power supply information and estimated grid connection demand information of the power grid 140 within the target time period. Further, the processor 111 may determine the saturation capacity of the battery 120 within the target time period based on the estimated charging demand information, the estimated photovoltaic power supply information, the estimated power grid power supply information, and the estimated grid connection demand information. More descriptions regarding the above embodiments may be found elsewhere in the present disclosure. See, e.g., FIG. 7 and relevant descriptions thereof.

In 620, a plurality of output powers each of which is when the source object supplies power to the battery and one or more output powers when the source object supplies power to the one or more other objects within one of a plurality of sub-time periods of the target time period may be determined based on the saturation capacity, the charging demand, and the power supply information.

In some embodiments, when the target object includes the battery 120 and other objects, the processor 111 may determine, based on the preset saturation capacity, the charging demand, and the power supply information, a plurality of output powers each of which is when the source object supplies power to the battery and one or more output powers when the source object supplies power to the other objects within one of a plurality of sub-time periods of the target time period through a power allocation model. A time duration of the sub-time period may be preset, for example, the time duration may be preset to 1.5 h.

It should be understood that the storage capacity of the battery 120 being less than the saturation capacity of the battery 120 may indicate that the storage capacity of the battery 120 is low. The lower the storage capacity of the battery 120, the more the battery 120 needs to supplement power to output power within the target time period, so as to maintain a normal operation of the charging device 110 within the target time period. Therefore, when the storage capacity of the battery 120 is less than the saturation capacity of the battery 120, and the greater the difference between the saturation capacity of the battery 120 and the storage capacity of the battery 120, the greater the output power of the source object to charge the battery 120, and the smaller the output power of the power output to the other objects. The storage capacity of the battery 120 being greater than or equal to the saturation capacity of the battery 120 may indicate that the storage capacity of the battery 120 is relatively great. In such cases, the storage capacity in the battery 120 is sufficient to maintain the normal operation of the charging device 110 within the target time period. Therefore, when the storage capacity of the battery 120 is greater than or equal to the saturation capacity of the battery 120, and the greater the difference between the storage capacity of the battery 120 and the saturation capacity of the battery 120, the smaller the output power of the source object to charge the battery 120, and the source object may stop supplying power until the battery 120 is fully charged. In addition, when the storage capacity of the battery 120 is greater than or equal to the saturation capacity of the battery 120, and the greater the difference between the storage capacity of the battery 120 and the saturation capacity of the battery 120, the greater the output power for charging other objects.

For example, when the target object includes the electric load 150 and the battery 120, the processor 111 may determine, based on the preset saturation capacity, the load charging demand information, the battery charging demand information, and the power supply information of the source object, output powers of the source object within four sub-time periods of the target time period through the power allocation model. The output powers of the source object when supplying power to the battery 120 may respectively be 12 kW, 11 kW, 8 kW, and 3 kW, and the output power of the source object when supplying power to the electric load 150 may respectively be 8 kW, 9 kW, 12 kW, and 17 kW.

The power allocation model may analyze the saturation power, the charging demand, and the power supply information, and determine the plurality of output powers each of which is when the source object supplies power to the battery 120 and the one or more output powers when the source object supplies power to the one or more other objects within one of the plurality of sub-time periods of the target time period. The power allocation model may include a machine learning mode. For example, the machine learning model may include a convolutional neural network model, a deep neural network model, etc., or a combination thereof An input of the power allocation model may include the preset saturation power, the charging demand, and the power supply information. An output of the power allocation model may include the plurality of output powers each of which is when the source object supplies power to the battery 120 and the one or more output powers when the source object supplies power to the one or more other objects within one of the plurality of sub-time periods of the target time period.

Parameters of the power allocation model may be obtained through a training process. The processor 111 may train a preliminary power allocation model based on a plurality of groups of first training samples with first labels. Each group of first training samples may include a sample saturation capacity, a sample charging demand, and sample power supply information. The first label of the first training samples may include a plurality of output powers each of which is when a sample source object supplies power to a sample battery and one or more output powers when the sample source object supplies power to one or more other sample objects in one of a plurality of sample sub-time periods of a plurality of sample time periods. After charging situations of the sample battery and other sample objects are obtained, analyzed, and processed, the first label may be obtained by manually labeling an optimal charging plan in each sample sub-period (e.g., a sample charging power of the sample battery).

According to some embodiments of the present disclosure, the saturation capacity, the charging demand, and the power supply information may be analyzed and processed such that the output power of the source object may be continuously adjusted based on the storage capacity of the battery 120 when charging the battery 120. In such cases, it may be ensured that the storage capacity in the battery 120 is sufficient to maintain the normal operation of the charging device 110 within the target time period, which realizes a scientific and reasonable allocation of power, and at the same time increases a service life of the battery 120.

FIG. 7 is a flowchart illustrating an exemplary process for determining a saturation capacity according to some embodiments of the present disclosure. In some embodiments, a process 700 may be executed by the processor 111. As shown in FIG. 7, the process 700 includes the following operations.

In 710, estimated charging demand information of an estimated electric load, estimated photovoltaic power supply information of the photovoltaic system, estimated power grid power supply information and estimated grid connection demand information of the power grid within the target time period may be determined.

The estimated electric load refers to an electric load of a power transmission within an estimated target time period. For example, the estimated electric load may be 15 vehicles.

The estimated charging demand information reflects charging demand information of the estimated electric load within the target time period. For example, the estimated charging demand information may be an estimated total load power demand of the electric load within the target time period.

The estimated photovoltaic power supply information refers to estimated photovoltaic power supply information of the photovoltaic system 130 within the target time period. For example, the estimated photovoltaic power supply information may be an estimated total photovoltaic power supply of the photovoltaic system 130 within the target time period.

The estimated power grid power supply information refers to estimated power grid power supply information of the power grid 140 within the target time period. For example, the estimated power grid power supply information may be an estimated total power grid power supply, an estimated electricity price, and an estimated output power, etc. of the power grid 140 within the target time period.

The estimated grid connection demand information refers to estimated grid connection demand information of the power grid 140 within the target time period. For example, the estimated power supply information of the grid may be an estimated grid connection power demand, an estimated grid connection time, and an estimated electricity demand of the power grid 140 within the target time period.

In some embodiments, the processor 111 may determine the estimated charging demand information, the estimated photovoltaic power supply information, the estimated power grid power supply information, and the estimated grid connection demand information in various manners. For example, the processor 111 may determine historical grid connection demand information of the power grid 140 in at least one historical time period as the estimated grid connection demand information by querying the historical grid connection demand information of the power grid 140 in historical data. The at least one historical time period may be the same as or similar to the target time period. It should be noted that a time duration of the historical time period should be equal to the time duration of the target time period. A manner of determining other information may be the same as or similar to the manner of determining the estimated grid connection demand information.

In some embodiments, through an estimation model, the processor 111 may also determine the estimated charging demand information of the estimated electric load, the estimated photovoltaic power supply information of the photovoltaic system 130, and the estimated power grid power supply information and the estimated grid connection demand information of the power grid 140 within the target time period based on weather information and specific time information within the target time period. The weather information within the target time period may include but not limited to a light intensity, a light time, a temperature, etc., and the weather information may be obtained through the network.

It should be understood that the weather in the target time period may affect the power supply of the photovoltaic system 130 and the power grid 140. For example, when the light intensity is low or the light time is too short, the photovoltaic system 130 may generate less power. As another example, when the temperature is too high, more loads may be connected with the power grid 140, which may affect the grid connection demand information of the power grid 140. The estimation model may analyze and process the weather information and specific time information within the target time period. Through the estimation model, the estimated charging demand information of the estimated electric load, the estimated photovoltaic power supply information of the photovoltaic system 130, and the estimated power grid power supply information and the estimated grid connection demand information of the power grid 140 within the target time period may be determined.

An input of the estimation model may include the weather information and the specific time information within the target time period, and an output may include the estimated charging demand information of the estimated electric load within the target time period, the estimated photovoltaic power supply information of the photovoltaic system 130, and the estimated power grid power supply information and the estimated grid connection demand information within the target time period of the power grid 140. The estimation model may include a deep learning model or other machine learning models that implement the functions.

The estimation model may be trained based on the historical data. The processor 111 may train a preliminary estimation model based on a plurality of groups of second training samples with second labels, and each group of second training samples may include sample weather information and sample specific time information within a sample target time period. The second label of the second training sample may include sample charging demand information of a sample electric load, sample photovoltaic power supply information, sample power grid power supply information, and sample grid connection demand information within a sample target time period. The second training samples and the second labels may be obtained based on the historical data of the charging device 110.

In 720, the saturation capacity of the battery within the target time period may be determined based on the estimated charging demand information, the estimated photovoltaic power supply information, the estimated power grid power supply information, and the estimated grid connection demand information.

In some embodiments, the processor 111 may determine the saturation capacity of the battery 120 within the target time period based on the estimated charging demand information, the estimated photovoltaic power supply information, the estimated power grid power supply information, and the estimated grid connection demand information. For example, the saturation power may be determined based on a following quantitative relationship: saturation capacity=total load electricity demand+grid connection electricity demand−estimated total photovoltaic power supply−estimated total power grid power supply. The total load electricity demand, the grid connection electricity demand, the estimated total photovoltaic power supply, and the estimated total power grid power supply may be determined based on the estimated charging demand information, the estimated grid connection demand information, the estimated photovoltaic power supply information, and the estimated power grid power supply information, respectively.

According to the method described in some embodiments of the present disclosure, by estimating and analyzing the charging demand of the electric load 150, the power supply situation of the photovoltaic system 130, and the grid connection demand of the power grid 140 within the target time period, the saturation capacity of the battery 120 that is more in line with a power consumption and power supply situations within the target time period may be determined such that the battery 120 may maintain a normal operation of the charging system under different circumstances.

Figure 8:
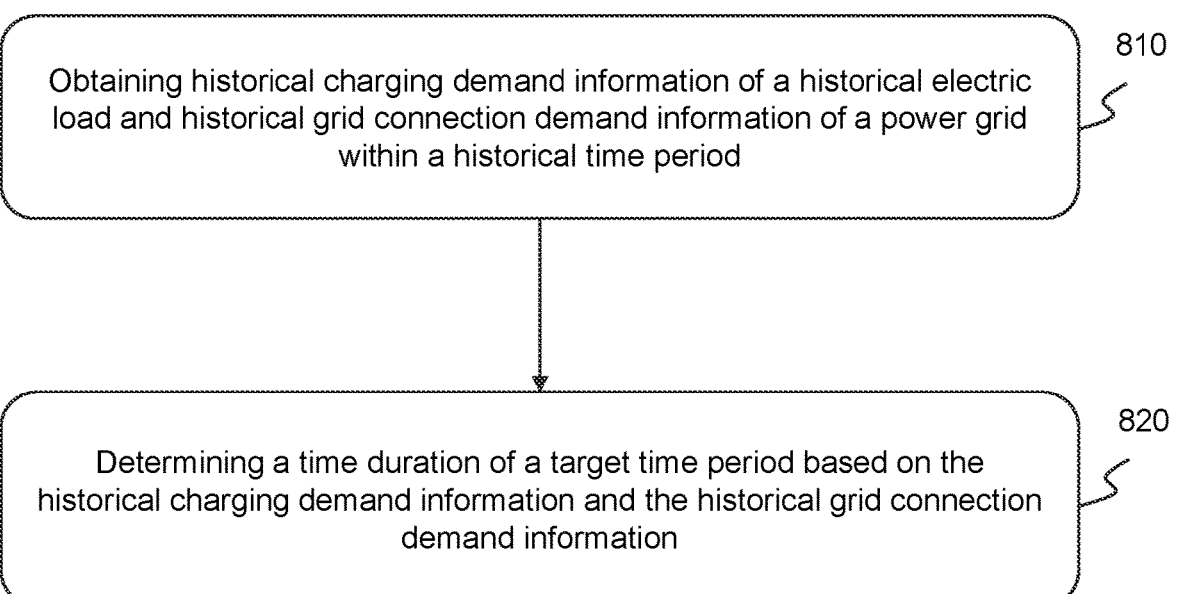
FIG. 8 is a flowchart illustrating an exemplary process for determining a time duration of a target time period according to some embodiments of the present disclosure.

FIG. 8 is a flowchart illustrating an exemplary process for determining a time duration of a target time period according to some embodiments of the present disclosure. In some embodiments, a process 800 may be executed by the processor 111. As shown in FIG. 8, the process 800 includes the following operations.

In 810, historical charging demand information of a historical electric load and historical grid connection demand information of the power grid within a historical time period may be obtained.

The historical electric load refers to one or more electric loads in the historical time period. The historical charging demand information refers to charging demand information of the historical electric load in the historical time period. The historical grid connection demand information refers to grid connection demand information of the power grid 140 in the historical time period. The historical time period may be a time period of a preset time duration that is relatively similar to the target time period, for example, a time period of a preset time duration on a date close to the target time period or with a weather situation similar to the weather situation of the target time period. The time duration of the historical time period may be preset, for example, preset as 2 days.

In some embodiments, the processor 111 may determine the historical charging demand information of the historical electric load and the historical grid connection demand information of the power grid 140 within the historical time period by querying the historical data (e.g., a database including the historical data).

In 820, the time duration of the target time period may be determined based on the historical charging demand information and the historical grid connection demand information.

In some embodiments, the processor 111 may determine historical mutations in the historical time period based on the historical charging demand information and the historical grid connection demand information. The historical mutations may reflect a sudden change in the charging demand information of the historical electric load and/or a sudden change in the grid connection demand information of the power grid 140 within the historical time period. In some embodiments, the processor 111 may preset a mutation threshold corresponding to a parameter (e.g., an electricity demand, a power demand, etc.) in the charging demand information. When the parameter in the historical charging demand information in a certain historical time period is higher than the mutation threshold, the processor 111 may determine that a mutation has occurred in the historical time period, which may be regarded as a historical mutation. The determination of the historical mutation based on the historical grid connection demand information of the power grid 140 is similar to the determination of the historical mutation based on the historical charging demand information.

In some embodiments, the time duration of the target time period may be negatively correlated with an occurrence frequency of the historical mutation. The higher the occurrence frequency of the historical mutation, the shorter the time duration of the target time period. For example, time duration of target time period=a/occurrence frequency of historical mutations, where a indicates a constant greater than or equal to 1, which may be determined based on historical experience data, a system default value, etc.

It should be understood that a higher occurrence frequency of the historical mutation indicates an instability of the operation of the electric load 150 and/or the power grid 140. At this time, if the estimated charging demand information, the estimated photovoltaic power supply information, the estimated power grid power supply information, and the estimated grid connection demand information are determined based on a previous time duration, it may be difficult to obtain an accurate estimation result. In such cases, the time duration of the target time period may be shortened such that the estimated charging demand information, the estimated photovoltaic power supply information, the estimated power grid power supply information, and the estimated grid connection demand information may be determined more frequently to improve the accuracy of the estimated result.

In some embodiments, the processor 111 may also determine the time duration of the target time period based on the historical charging demand information and the historical grid connection demand information through other manners such as modeling, genetic algorithm, and other data analysis algorithms.

According to some embodiments of the present disclosure, by determining the time duration of the target time period, a suitable frequency for estimating the related parameters (e.g., the estimated charging demand information, the estimated photovoltaic power supply information, the estimated power grid power supply information, and the estimated grid connection demand information) may be determined, which may improve the accuracy of estimating the relevant parameters.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. Such modifications, improvements and corrections are suggested in the present disclosure, so such modifications, improvements and corrections still belong to the spirit and scope of the exemplary embodiments of the present disclosure.

At the same time, the present disclosure uses specific words to describe the embodiments of the present disclosure. For example, "one embodiment", "an embodiment", and/or "some embodiments" mean certain information, structures or characteristics related to at least one embodiment in the present disclosure. Therefore, it is emphasized and should be appreciated that two or more references to "an embodiment" or "one embodiment" or "an alternative embodiment" in various portions of the present disclosure are not necessarily all referring to the same embodiment. In addition, certain information, structures, or characteristics in one or more embodiments of the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

In the same way, it should be noted that in order to simplify the expression disclosed in the present disclosure so as to help the understanding of one or more embodiments of the present disclosure, in the foregoing description of the embodiments of the present disclosure, sometimes various information is combined into one embodiment, drawing or descriptions thereof. However, this method of disclosure does not mean that the subject of the present disclosure requires more information than is mentioned in the claims. Indeed, the embodiment information is less than all information about a single above-disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications are also possible within the scope of the present disclosure. Thus, by way of example, but not of limitation, alternative configurations of the embodiments of the application may be utilized in accordance with the teachings herein. Accordingly, embodiments of the present disclosure are not limited to that precisely as shown and described.

What is claimed is:

1. A device for charging dispatching, comprising: a first sensor, a second sensor, a third sensor, a charging pile, and a processor, wherein the first sensor is configured to obtain first sensing information from a battery connected with the charging pile, wherein the first sensing information includes power situation information of the battery;

the second sensor is configured to obtain second sensing information from a photovoltaic system connected with the charging pile, wherein the second sensing information includes power situation information of the photovoltaic system;

the third sensor is configured to obtain third sensing information from a power grid connected with the charging pile, wherein the third sensing information includes power situation information of the power grid;

the charging pile is configured to transmit power to a target object, wherein the target object includes at least one of the power grid, the battery, and an electric load; and the processor is configured to:

determine, based on the first sensing information, the second sensing information, and the third sensing information, power storage information of the battery, photovoltaic power supply information of the photovoltaic system, and power grid power supply information of the power grid, respectively;

determine the target object that needs to be charged based on the charging pile;

determine, based on at least one of the power storage information, the photovoltaic power supply information, and the power grid power supply information, a source object charging the target object, wherein the source object includes at least one of the power grid, the photovoltaic system, and the battery; during a same charging process, the source object is different from the target object;

control the charging pile to transmit, based on the source object, power to the target object, wherein to control the charging pile to transmit, based on the source object, power to the target object, the processor is configured to:

determine, based on a charging demand of the target object and power supply information of the source object, an output power when the source object supplies power to the target object;

wherein when the target object includes the battery and one or more other objects, the processor is further configured to:

determine estimated charging demand information of the electric load, estimated photovoltaic power supply information of the photovoltaic system, and estimated power grid power supply information and estimated grid connection demand information of the power grid within a target time period; and determine a saturation capacity of the battery within the target time period based on the estimated charging demand information, the estimated photovoltaic power supply information, the estimated power grid power supply information, and the estimated grid connection demand information;

determine, based on the saturation capacity, the charging demand, and the power supply information, a plurality of output powers, each of the plurality of output powers being for the source object supplying power to one of the battery and the one or more other objects within one of a plurality of sub-time periods of the target time period.

2. The device of claim 1, wherein the processor is further configured to:

obtain a plurality of power supply priorities of a plurality of candidate source objects, wherein the plurality of candidate source objects include the power grid, the photovoltaic system, and the battery; and determine the source object that meets the charging demand of the target object from the plurality of candidate source objects by processing, based on the plurality of power supply priorities, power supply information corresponding to the plurality of candidate source objects, wherein the power supply information corresponding to the battery is the power storage information, the power supply information corresponding to the photovoltaic system is the photovoltaic power supply information, and the power supply information corresponding to the power grid is the power grid power supply information the processor is further configured to:

determine whether a candidate source object with a highest priority among the plurality of candidate source objects has a possibility of supplying power based on the power supply information of the candidate source object with the highest priority;

in response to a determination that the candidate source object with the highest priority has no possibility of supplying power, sequentially determine whether candidate source objects with lower priorities have the possibility of supplying power, until that a candidate source object with the possibility of supplying power is determined or none of the plurality of candidate source objects having the possibility of supplying power is determined.

3. The device of claim 2, wherein a power supply priority of the photovoltaic system is the highest power supply priority in the plurality of power supply priorities of the plurality of candidate source objects, indicating that the photovoltaic system is preferentially used for power supply.

4. The device of claim 1, further comprising a fourth sensor, wherein the fourth sensor is configured to obtain fourth sensing information from the electric load connected with the charging pile, and the fourth sensing information is power situation information of the electric load; and the processor is further configured to:

determine battery charging demand information of the battery based on the first sensing information;

determine grid connection demand information of the power grid based on the third sensing information, wherein the grid connection demand information is used to indicate demand information that the power grid needs to transmit power together with the source object;

determine load charging demand information of the electric load based on the fourth sensing information; and determine the target object based on the battery charging demand information, the load charging demand information, and the grid connection demand information.

5. The device of claim 1, wherein the processor is further configured to:

the power supply information corresponding to the battery is the power storage information, the power supply information corresponding to the photovoltaic system is the photovoltaic power supply information, and the power supply information corresponding to the power grid is the power grid power supply information.

6. The device of claim 1, wherein a plurality of source objects and a plurality of target objects are determined, the processor is further configured to:

determine an input power of the plurality of target objects based on the charging demand;

determine a difference between an output power of the plurality of source objects and a sum of the input power and a useless power corresponding to the plurality of source objects;

in response to a determination that the difference is less than or equal to 0 kW, determine the output power of each of the plurality of source objects based on the plurality of power supply priorities of the plurality of source objects, and determine that the source object transmits power to the target object based on the output power of the source object;

in response to a determination that the difference is greater than 0 kW, determine, based on a plurality of charging properties of the plurality of target objects, the output power of one of the plurality of source objects transmitting power to one of the plurality of target objects, and determine that the source object transmits power to the target object based on the output power of the one of the plurality of source objects.

7. The device of claim 1, wherein the processor is further configured to:

through an estimation model, determine the estimated charging demand information of the estimated electric load, the estimated photovoltaic power supply information of the photovoltaic system, and the estimated power grid power supply information and the estimated grid connection demand information of the power grid within the target time period, based on weather information and specific time information within the target time period, wherein the estimation model is a deep learning model.

8. The device of claim 1, wherein the processor is further configured to:

obtain historical charging demand information of a historical electric load and historical grid connection demand information of the power grid within a historical time period; and determine a time duration of the target time period based on the historical charging demand information and the historical grid connection demand information, wherein the target time period refers to a time period during which a reserved saturation capacity of the battery needs to be evaluated.

9. The device of claim 8, wherein the processor is further configured to:

determine historical mutations in the historical time period based on the historical charging demand information and the historical grid connection demand information, the historical mutations reflecting a sudden change in the historical charging demand information of the historical electric load and/or a sudden change in the historical grid connection demand information of the power grid within the historical time period, and the time duration of the target time period being negatively correlated with an occurrence frequency of the historical mutation.

10. A method for charging dispatching, executed by a processor in a device for charging, comprising:

determining, based on first sensing information, second sensing information, and third sensing information, power storage information of a battery connected with a charging pile, photovoltaic power supply information of a photovoltaic system connected with the charging pile, and power grid power supply information of a power grid connected with the charging pile, respectively, wherein the first sensing information includes power situation information of the battery obtained through a first sensor of the device for charging, the second sensing information includes power situation information of the photovoltaic system obtained through a second sensor of the device for charging, and the third sensing information includes power situation information of the power grid obtained through a third sensor of the device for charging;

determining a target object that needs to be charged based on the charging pile, wherein the target object includes at least one of the power grid, the battery, and the electric load;

determining, based on at least one of the power storage information, the photovoltaic power supply information, and the power grid power supply information, a source object charging the target object, wherein the source object includes at least one of the power grid, the photovoltaic system, and the batteries; during a same charging process, the source object is different from the target object;

controlling the charging pile to transmit, based on the source object, power to the target object, including:

determining, based on a charging demand of the target object and power supply information of the source object, an output power when the source object supplies power to the target object;

wherein when the target object includes the battery and one or more other objects, the processor is further configured to:

determine estimated charging demand information of the electric load, estimated photovoltaic power supply information of the photovoltaic system, and estimated power grid power supply information and estimated grid connection demand information of the power grid within a target time period; and determine a saturation capacity of the battery within the target time period based on the estimated charging demand information, the estimated photovoltaic power supply information, the estimated power grid power supply information, and the estimated grid connection demand information;

determine, based on the saturation capacity, the charging demand, and the power supply information, a plurality of output powers each of the plurality of output powers being for the source object supplying power to one of the battery and the one or more other objects within one of a plurality of sub-time periods of the target time period.

11. The method of claim 10, wherein the determining, based on at least one of the power storage information, the photovoltaic power supply information, and the power grid power supply information, a source object charging the target object comprises:

obtaining a plurality of power supply priorities of a plurality of candidate source objects, wherein the plurality of candidate source objects include the power grid, the photovoltaic system, and the battery; and determine the source object that meets the charging demand of the target object from the plurality of candidate source objects by processing, based on the plurality of power supply priorities, power supply information corresponding to the plurality of candidate source objects, wherein the power supply information corresponding to the battery is the power storage information, the power supply information corresponding to the photovoltaic system is the photovoltaic power supply information, and the power supply information corresponding to the power grid is the power grid power supply information.

12. The method of claim 11, wherein a power supply priority of the photovoltaic system is the highest power supply priority in the plurality of power supply priorities of the plurality of candidate source objects, indicating that the photovoltaic system is preferentially used for power supply.

13. The method of claim 10, wherein the determining a target object that needs to to be charged based on the charging pile comprises:

determining battery charging demand information of the battery based on the first sensing information;

determining grid connection demand information of the power grid based on the third sensing information, wherein the grid connection demand information is used to indicate demand information that the power grid needs to transmit power together with the source object;

determining load charging demand information of the electric load based on the fourth sensing information, wherein the fourth sensing information is power situation information of the electric load obtained through a fourth sensor of the device for charging; and determine the target object based on the battery charging demand information, the load charging demand information, and the grid connection demand information.

14. The method of claim 10, further comprising:

determining, based on a charging demand of the target object and power supply information of the source object, an output power when the source object supplies power to the target object, wherein the power supply information corresponding to the battery is the power storage information, the power supply information corresponding to the photovoltaic system is the photovoltaic power supply information, and the power supply information corresponding to the power grid is the power grid power supply information.

15. The method of claim 14, wherein when the target object includes the battery and one or more other objects, the determining, based on a charging demand of the target object and power supply information of the source object, an output power when the source object supplies power to the target object comprises:

determining a saturation capacity of the battery within a target time period; and determining, based on the saturation capacity, the charging demand, and the power supply information, a plurality of output powers each of which is when the source object supplies power to the battery and one or more output powers when the source object supplies power to the one or more other objects within one of a plurality of sub-time periods of the target time period.

16. The method of claim 15, wherein the determining a saturation capacity of the battery within a target time period comprises:

determining estimated charging demand information of an estimated electric load, estimated photovoltaic power supply information of the photovoltaic system, and estimated power grid power supply information and estimated grid connection demand information of the power grid within the target time period; and determining the saturation capacity of the battery within the target time period based on the estimated charging demand information, the estimated photovoltaic power supply information, the estimated power grid power supply information, and the estimated grid connection demand information.

17. The method of claim 15, wherein a time duration of the target time period is determined according to:

obtaining historical charging demand information of a historical electricload and historical grid connection demand information of the power grid within a historical time period; and determining the time duration of the target time period based on the historical charging demand information and the historical grid connection demand information.

18. A non-transitory computer-readable storage medium storing computer instructions that, when executed by at least one processor, direct the at least one processor to perform the method for charging dispatching of claim 10.

\* \* \* \* \*